US010121058B2

(12) United States Patent
Askari et al.

(10) Patent No.: US 10,121,058 B2
(45) Date of Patent: Nov. 6, 2018

(54) FACILITATING MONITORING OF USERS

(71) Applicant: PRILYX RESEARCH AND DEVELOPMENT LTD., Vancouver (CA)

(72) Inventors: Peyman Askari, Vancouver (CA); Kazem Askari, West Vancouver (CA); Jonathan Tzu Tiam Chong, Surrey (CA); Jason Chung, Surrey (CA); Gurubaran Sittampalam, Vancouver (CA)

(73) Assignee: PRILYX RESEARCH AND DEVELOPMENT LTD., Vancouver, British Columbia (CA)

( * ) Notice: Subject to any disclaimer, the term of this patent is extended or adjusted under 35 U.S.C. 154(b) by 74 days.

(21) Appl. No.: 15/169,491

(22) Filed: May 31, 2016

(65) Prior Publication Data
US 2017/0344810 A1 Nov. 30, 2017

(30) Foreign Application Priority Data
May 30, 2016 (CA) ..................................... 2931630

(51) Int. Cl.
*G06K 9/62* (2006.01)
*G06K 9/00* (2006.01)
*G06F 17/30* (2006.01)
*H04N 7/18* (2006.01)

(52) U.S. Cl.
CPC ..... *G06K 9/00288* (2013.01); *G06F 17/3028* (2013.01); *G06F 17/30386* (2013.01); *G06F 17/30554* (2013.01); *H04N 7/183* (2013.01)

(58) Field of Classification Search
CPC ....... G08B 13/2417; G06K 2017/0045; G06K 9/00288–9/00295; G07C 9/00119; G07C 2011/02; G07C 9/00111
USPC .................................................. 382/115–127
See application file for complete search history.

(56) References Cited

U.S. PATENT DOCUMENTS

| 6,873,260 | B2 * | 3/2005 | Lancos | G07C 9/00103 340/5.2 |
| 7,286,158 | B1 * | 10/2007 | Griebenow | G07C 9/00103 340/505 |
| 7,802,724 | B1 * | 9/2010 | Nohr | G07C 9/00111 235/384 |
| 2011/0309931 | A1 * | 12/2011 | Rose | E21F 17/18 340/539.13 |

(Continued)

*Primary Examiner* — Brian Werner

(57) ABSTRACT

A computer-implemented method for facilitating monitoring of a first user of a plurality of users is provided. The method involves causing at least one processor to receive a first user device identifier for identifying a first user device associated with the first user and first user registration information associated with the first user, causing the at least one processor to store in memory the first user device identifier and first user information including the first user registration information, causing the at least one processor to receive a first information request including the first user device identifier, and causing the at least one processor to produce signals representing the first user information for causing at least one display to display the first user information to be displayed in association with a representation of a location of the first user. Apparatuses, systems and computer-readable media are also provided.

22 Claims, 20 Drawing Sheets

(56) References Cited

U.S. PATENT DOCUMENTS

2014/0337066 A1\* 11/2014 Kephart ............ G06K 9/00771
705/5

\* cited by examiner

| | User Registration Record | |
|---|---|---|
| 252 | TID | 82CB06A9A5F34AD74EBD8AE7 |
| 254 | Timestamp | 2015-03-09 13:59:37 |
| 256 | Gate ID | Gate-74 |
| 258 | Site ID | Site-1 |
| 260 | EPC | CCCC96ADA5F34AD94EBD8AEA |
| 262 | Face Capture |  |
| 264 | Document Scan | Drivers License<br>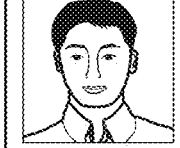 Doe, John<br>1234 1st Avenue<br>Baku, AZ<br>AZ1234 |
| 266 | Registration Processing Time | 7.15 |
250
FIG. 9

400

User ticket information record

| 402 | TID | 82CB06A9A5F34AD74EBD8AE7 |
|---|---|---|
| 404 | Ticket Number | 2695 |
| 406 | Name | John |
| 408 | Surname | Doe |
| 410 | Gate | 107 |
| 412 | Row | GA |
| 414 | Seat | 1986 |
| 416 | barcode | 18051754149438-0 |
| 420 | Account numbers | 123456 |
| 426 | Passport id | 12345678 |
| 428 | Date of birth | 01/01/1990 |
| 430 | Session description | Women's Bronze Medal: AZE -SRB |
| 432 | Session code | V037 |
| 436 | Nationality | AZ |
| 438 | Gender | M |
| 440 | Passport expiry date | 2020-02-27 |
| 442 | Address | 1234 1st Avenue |
| 444 | Postal code | AZ1234 |
| 446 | City | Baku |
| 448 | Country of residence | AZ |
| 450 | Mobile numbers | XXX-XXX-XXXX |
| 452 | e-mail | johndoe@example.com |

FIG. 12

Information Request Record

| | | |
|---|---|---|
| 662 ~ | EPC | CCCC96ADA5F34AD94EBD8AEA |

700
Requested User Information Record
| | | |
|---|---|---|
| 702 | Record ID | 1 |
| 704 | EPC | CCCC96ADA5F34AD94EBD8AEA |
| 706 | Entry Time | 2015-03-09 14:59:37 |
| 708 | Face Capture |  |
| 710 | Document Scan | Drivers License<br>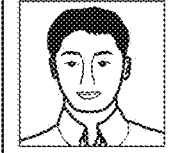 Doe, John<br>1234 1st Avenue<br>Baku, AZ<br>AZ1234 |
| 712 | Entry GateID | Gate-74 |
| 714 | Site ID | Site-1 |
| 716 | Registration Processing Time | 7.15 |
| 718 | TID | 82CB06A9A5F34AD74EBD8AE7 |
| 720 | Name | John |
| 722 | Surname | Doe |
FIG. 17

FACILITATING MONITORING OF USERS

BACKGROUND

1. Field

This invention relates to facilitating monitoring of users and more particularly to facilitating monitoring of at least one of a plurality of users.

2. Description of Related Art

Monitoring users with a view to providing security has become more important for safety and protection of infrastructure in various environments and at events or locations worldwide. Security solutions may be implemented through video camera and computer systems and human implemented tracking and/or identification of individuals, for example. However, known computer and video systems for tracking and identification may not facilitate the provision of a rapid, consistent, and/or cost effective solution for monitoring users.

SUMMARY

In one embodiment there is provided a computer-implemented method for facilitating monitoring of a first user of a plurality of users. The method involves causing at least one processor to receive a first user device identifier for identifying a first user device associated with the first user and first user registration information associated with the first user, causing the at least one processor to store in memory the first user device identifier and first user information including the first user registration information, causing the at least one processor to receive a first information request including the first user device identifier, and causing the at least one processor to produce signals representing the first user information for causing at least one display to display the first user information in association with a representation of a location of the first user.

In another embodiment there is provided a computer-implemented method for facilitating monitoring of a first user of a plurality of users. The method involves causing at least one processor to receive a first user device identifier for identifying a device associated with a first user and first user registration information associated with the first user, causing the at least one processor to store in memory the first user device identifier and first user information including the first user registration information, and causing the at least one processor to produce signals representing the first user device identifier and the first user information for causing the first user information to be analyzed to determine whether the first user information meets a person of interest criterion.

In another embodiment there is provided a system for facilitating monitoring of a first user of a plurality of users. The system includes at least one processor configured to receive a first user device identifier for identifying a first user device associated with the first user and first user registration information associated with the first user, store in memory the first user device identifier and first user information including the first user registration information, receive a first information request including the first user device identifier, and produce signals representing the first user information for causing at least one display to display the first user information in association with a representation of a location of the first user.

In another embodiment there is provided a system for facilitating monitoring of a first user of a plurality of users. The system includes at least one processor configured to receive a first user device identifier for identifying a device associated with a first user and first user registration information associated with the first user, store in memory the first user device identifier and first user information including the first user registration information, and produce signals representing the first user device identifier and the first user information for causing the first user information to be analyzed to determine whether the first user information meets a person of interest criterion.

In another embodiment there is provided a system for facilitating monitoring of a first user of a plurality of users. The system includes means for receiving a first user device identifier for identifying a first user device associated with the first user and first user registration information associated with the first user, means for storing in memory the first user device identifier and first user information including the first user registration information, means for receiving a first information request including the first user device identifier, and means for producing signals representing the first user information for causing at least one display to display the first user information in association with a representation of a location of the first user.

In another embodiment there is provided a system for facilitating monitoring of a first user of a plurality of users. The system includes means for receiving a first user device identifier for identifying a device associated with a first user and first user registration information associated with the first user, means for storing in memory the first user device identifier and first user information including the first user registration information, and means for producing signals representing the first user device identifier and the first user information for causing the first user information to be analyzed to determine whether the first user information meets a person of interest criterion.

In accordance with another embodiment there is provided a computer readable medium having stored thereon codes which when executed by at least one processor cause the at least one processor to perform any of the methods described above.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 9 is a representation of an exemplary user registration record that may be used in the system shown in FIG. 1;

FIG. 12 is a representation of an exemplary user ticket information record that may be used in the system shown in FIG. 1;

FIG. 17 is a representation of an exemplary requested user information record that may be used in the system shown in FIG. 1;

DETAILED DESCRIPTION

Aspects, features and embodiments of the invention are described with reference to illustrative embodiments and figures. Generally, there is provided methods, systems and apparatuses for facilitating monitoring of at least one user of a plurality of users.

Figure 1:
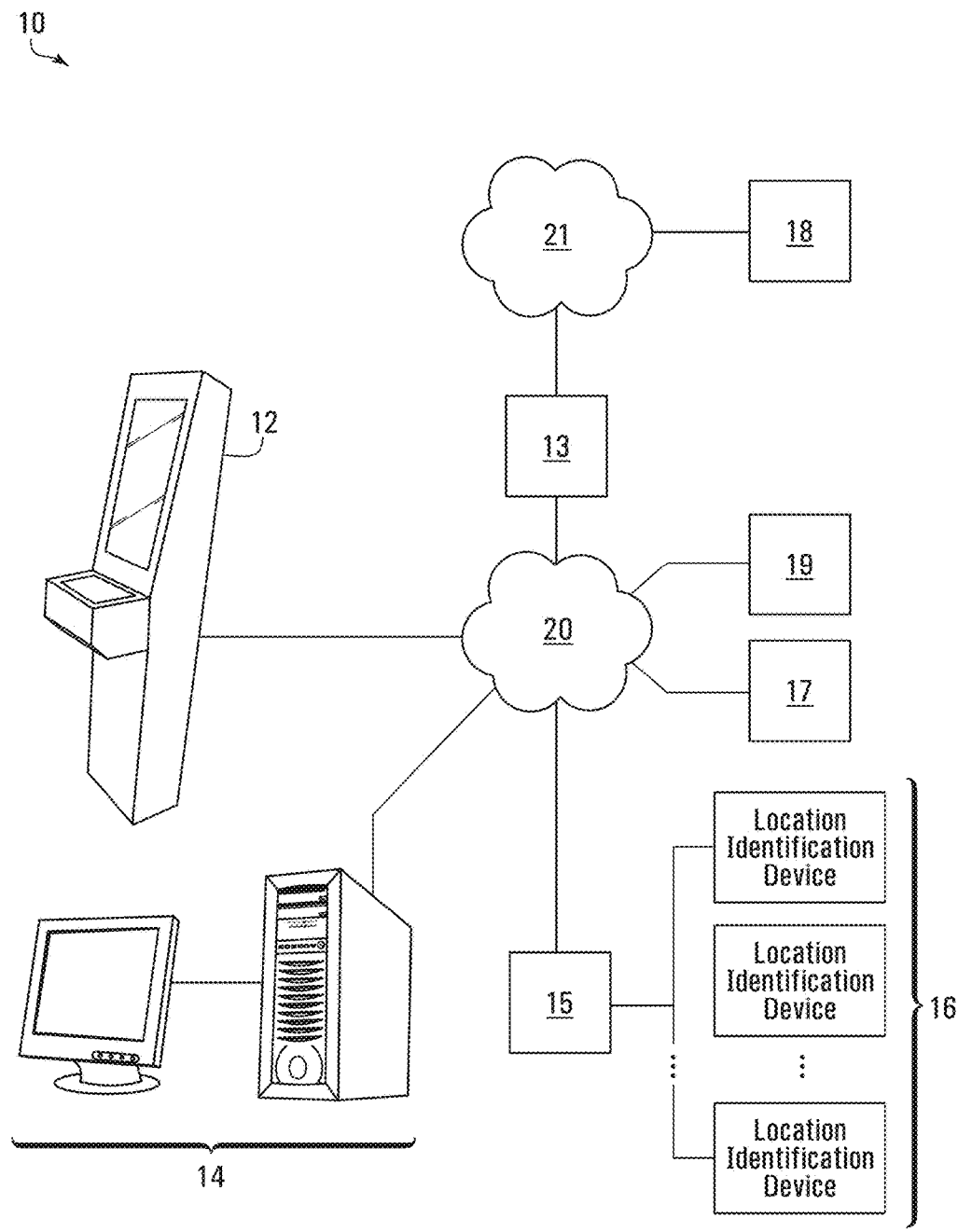
FIG. 1 is a schematic view of a system for facilitating monitoring of at least one of a plurality of users in accordance with various embodiments of the invention.

Referring to FIG. 1, according to one embodiment of the invention, there is provided a system 10 for facilitating monitoring of at least one user of a plurality of users. The system 10 includes a registration or gate device 12, which in the embodiment shown is implemented as a kiosk, a user monitoring server 13, a monitoring station 14, a person of interest server 17, a video management server 19, and a location monitoring server 15 in communication with a plurality of location identification devices 16 all of which are in communication via a network 20. In some embodiments, the network 20 may be a private network. The system 10 also includes a user information server 18 in communication with the user monitoring server 13 via a network 21, which in some embodiments may be a public network, such as the Internet, for example.

In various embodiments, the system 10 may be implemented to monitor an event environment or location, such as, for example a sporting event, concert, play, casino, theatre, or other location where a plurality of attendees or users are expected.

Generally, in some embodiments a monitoring user or security person may use the monitoring station 14 to access functionality provided by one or more of the servers 13, 15, 17, and 19. For example in some embodiments, the monitoring user may use a browser installed on the monitoring station to access location monitoring functionality provided by the location monitoring server 15, to monitor locations of users at the event. Similarly, the monitoring user may use a browser to access person of interest functionality provided by the person of interest server 17 and the monitoring user may use a browser to access video management functionality provided by the video management server 19.

In one embodiment a user may purchase a ticket for an event from a ticket provider or event coordinator. The ticket may be an e-ticket, a physical ticket, and/or any other device configured to be identified and monitored at the event, for example. In some embodiments, a personal device such as a smart phone may include a device identifier and may be configured to act as a ticket. The ticket provider may record various user ticket information in association with the ticket, which may provide particular insight into the ticket user and therefore may be helpful for security purposes when monitoring the user at the event. In one embodiment, the ticket provider may store the user ticket information including a ticket identifier in a database included in the user information server 18 shown in FIG. 1. The ticket identifier may be detectable from the ticket itself via a Radio-frequency identification (RFID) tag, bar code, QR code, NFC, and/or text on the ticket, for example. The user ticket information may include information about the ticket and/or biographical information about the user who purchased the ticket and/or an attendee who will be using the ticket.

Users or attendees to the event may, upon arriving, first use the registration device 12 to register for the event. For example, in some embodiments, registration at the registration device 12 may be required to gain entry into the event.

During registration, the registration device 12 may read the ticket identifier from the ticket and thus the registration device 12 may receive the ticket identifier. For example, in various embodiments, the ticket identifier may be an RFID tag value read from an RFID tag included with the ticket. For example, in some embodiments, the RFID tag may be an electronic product code (EPC) Gen 2 RFID tag, such as a Monza™ 4 tag chip. In some embodiments, an initial ticket identifier on the ticket may not be sufficient for location tracking purposes at the event and so the registration device 12 may generate and write a new ticket identifier to the ticket that is capable of facilitating location tracking of the ticket.

During registration, the registration device 12 may obtain or generate registration information associated with the user's registration. For example, in one embodiment, the registration device 12 may include a camera and the registration device may be configured to capture at least one image of the user when the user is using the registration device 12. In one embodiment, the registration device 12 may include an image scanner configured to read or scan an identification document provided by the first user, such as for example, a driving license.

The image scanner may be configured to wait for something to be placed on it, and once detected, scan the object and return a digital image, such as, for example, a JPEG format image. In some embodiments, for example, the image scanner may be a 3M™ document scanner. In various embodiments, the registration device 12 may determine or generate other registration information.

After the registration device 12 has captured the registration information, the registration device may transmit signals representing a ticket identifier and the registration information to the user monitoring server 13 which is configured to receive the ticket identifier and the registration information and facilitate monitoring of the user.

The user monitoring server 13 may store in memory the ticket identifier and user information including the user registration information. In some embodiments, the user monitoring server 13 may request user ticket information from the user information server 18 and include the user ticket information in the user information.

In some embodiments, the user monitoring server 13 may cause the user information to be analyzed to determine whether it meets a person interest or watch list criterion. For example, the user monitoring server 13 may transmit images of the user taken from the registration information to the person of interest server 17 to cause the images to be compared with images of persons of interest which one may wish to watch closely, such as, for example, known terrorists, criminals, troublemakers, or missing persons and to determine if the images of the user match up with any of the images of persons of interest.

A monitoring user who is using the monitoring station 14 may use a browser to access an application running on the person of interest server 17 and, if the application determines that the images of the user match a person of interest, the person of interest server 17 may cause a display of the monitoring station 14 to display an alert to the monitoring user. For example, the person of interest server 17 may determine that an image of a first user matches a person of interest and based on this determination cause the display of the monitoring station 14 to display an alert to the monitoring user using the monitoring station 14. In some embodiments, the person of interest server 17 may be configured to cause the display to display a location of the first user upon receiving a request via the monitoring station 14.

In some embodiments, the system 10 may monitor a location of the ticket of the user and thereby monitor a location of the user. The system 10 may facilitate display of the user information along with display of the location of the first user.

For example, in various embodiments, the location identification devices 16 may be configured to determine locations of tickets by detecting locations of the ticket identifiers. In some embodiments, each of the location identification devices 16 may be located at a different location at the event and may be configured to detect or read ticket identifiers when tickets are near the location identification device. For example, the location identification devices 16 may be located at entrances to rooms or areas, which may act as zones, and the location identification devices may be configured to read an RFID tag value acting as a ticket identifier from a ticket whenever the ticket is near the device. The location identification devices 16 may send location identification information associating RFID tag values, and therefore tickets, with location identification devices which detected the tickets and thereby provide location information for the tickets.

In some embodiments, the location may be determined using triangulation, such as, for example RFID signal triangulation. In some embodiments, the location may be determined using GPS, Smartphones, Bluetooth, ZigBee and/or using Wi-Fi signals. For example, in various embodiments, a user device or ticket may include a smartphone, laptop, PC, and/or SOM (System on Module), for example, and the device may send location data to the user monitoring server 13 which may act as a location identification device and pass the location information to the location monitoring server 15.

In one embodiment, a monitoring user interacting with the location monitoring server 15 via the monitoring station 14 may request information for a particular ticket and cause an information request including a ticket identifier to be sent from the location monitoring server 15 to the user monitoring server 13. The user monitoring server 13 may retrieve from memory user information associated with the ticket identifier and produce or transmit signals representing the user information to the location monitoring server 15 to cause the location monitoring server 15 to produce signals for causing the display of the monitoring station 14 to display the user information in association with a representation of the location of the user, as expected based on a determined location of the ticket. For example, the location monitoring server 15 may cause the display of the monitoring station 14 to display an image of the user, an image of the user's scanned identification document, and/or other user information in association with a representation of the location of the user.

While FIG. 1 shows a single registration device and a single monitoring station, for illustration purposes, in various embodiments, numerous registration devices may be included in the system 10, and/or the system 10 may include a plurality of monitoring stations generally similar to the monitoring station 14, which may be used by one or more monitoring users or security persons. Similarly, while FIG. 1 shows a plurality of location identification devices, in some embodiments, a single location identification device or generally one or more location identification devices 16 which are configured to determine locations of the tickets may be included in the system 10.

Registration Device

Figure 2:
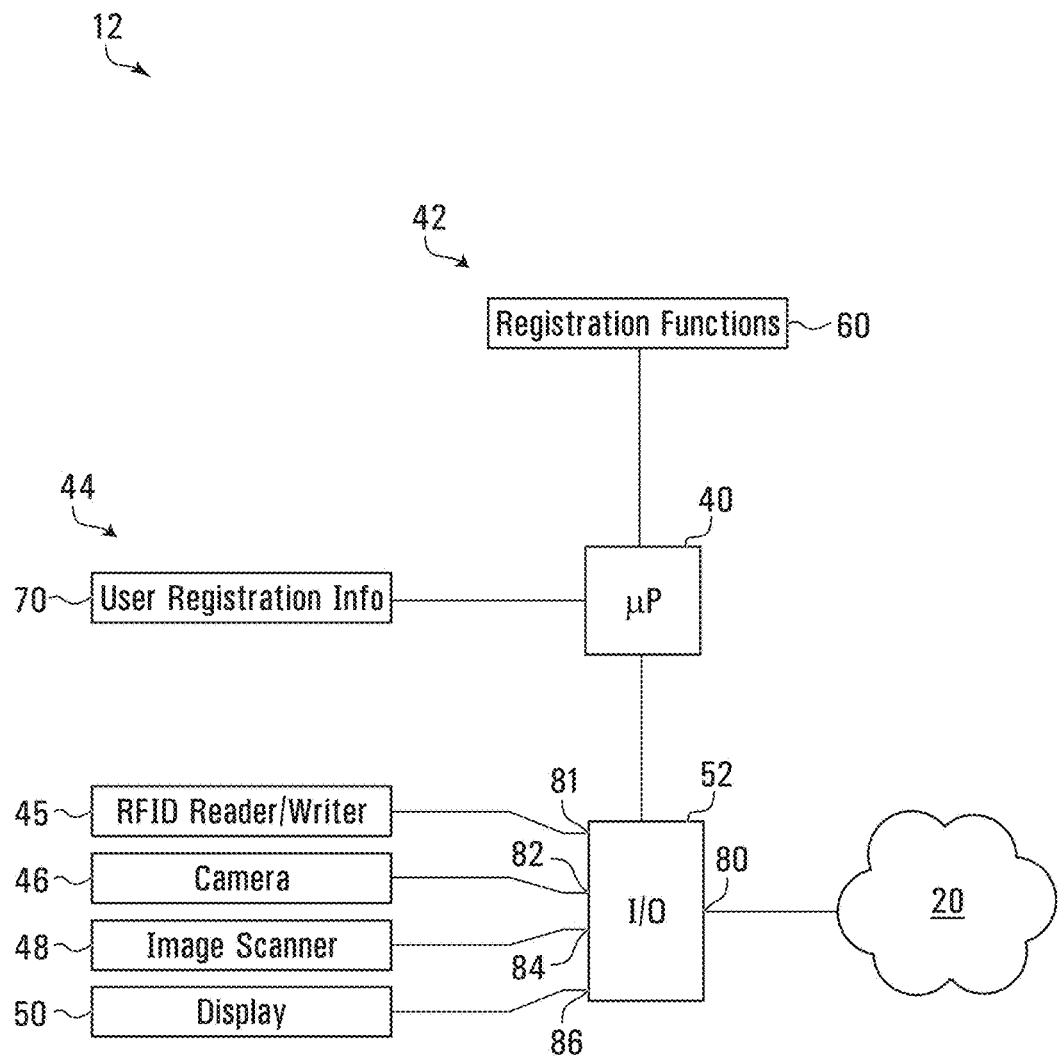
FIG. 2 is a schematic view of a registration device shown in the system of FIG. 1 including a processor circuit in accordance with various embodiments of the invention.

Referring to FIG. 2, a schematic view of the registration device 12 shown in FIG. 1 according to one embodiment is shown. In one embodiment, the registration device 12 may be implemented as a kiosk. In some embodiments, the registration device 12 may be implemented as any device which can read an identifier from a user identification device and can receive and/or generate registration information. For example, in various embodiments, the registration device 12 may include any of a variety of one or more computing devices including a handheld scanning device, a smartphone, a tablet, a laptop, a wearable computing device such as Google Glass™ or wireless watches and the like, or another form of computing device and/or any combination thereof.

Referring still to FIG. 2, the registration device 12 includes a processor circuit including a registration device processor 40 and a program memory 42, a storage memory 44, and an input/output (I/O) interface 52, all of which are in communication with the registration device processor 40. The registration device 12 also includes an RFID reader and writer 45, a camera 46, an image scanner 48, and a display 50. The I/O interface 52 includes an interface 81 for communicating with the RFID reader and writer 45, an interface 82 for communicating with the camera 46, an interface 84 for communicating with the image scanner 48, and an interface 86 for communicating with the display 50. The I/O interface 52 also includes an interface 80 for communicating with the user monitoring server 13. In some embodiments, the interface 80 may facilitate networked communication through the network 20, for example, and may include a network interface having a network interface card with an input/output for connecting to a network, through which communications may be conducted with devices connected to the network, such as the user monitoring server 13 shown in FIG. 1. Other network interfaces described herein may include generally similar elements.

Program codes for directing the registration device processor 40 to carry out various functions are stored in the program memory 42. The program memory 42 includes a block of codes 60 for directing the registration device 12 to effect registration functions. The storage memory 44 includes a plurality of storage locations including location 70 for storing user registration information. In various embodiments, the block of codes 60 may include one or more blocks of code stored in one or more locations in memory and the location 70 may include one or more locations in memory. In various embodiments, the plurality of storage locations may be stored in a database in the storage memory 44.

Each of the program memory 42 and storage memory 44 may be implemented as one or more storage devices including random access memory (RAM), a hard disk drive (HDD), a solid-state drive (SSD), a network drive, flash memory, a memory stick or card, any other form of computer-readable memory or storage medium, and/or a combination thereof. In some embodiments, the program memory 42, the storage memory 44, and/or any portion thereof may be included in a device separate from the registration device 12 and in communication with the registration device 12 via the I/O interface 52, for example. In various embodiments, other program memory, blocks of code, storage memory, and locations in memory described herein may be implemented generally similarly to as described above for the program memory 42 and the storage memory 44.

User Monitoring Server—Processor Circuit

Figure 3:
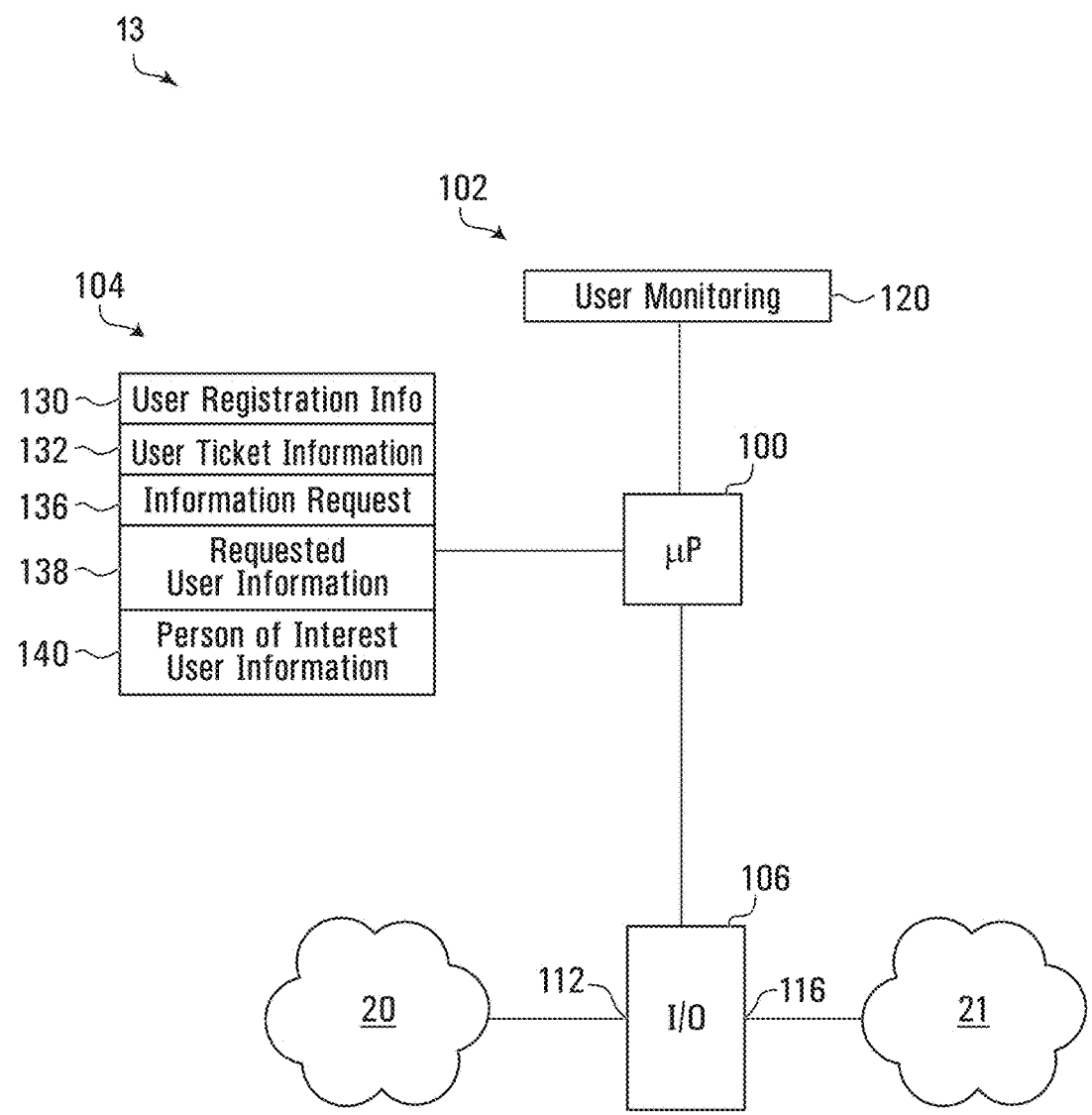
FIG. 3 is a schematic view of a user monitoring server shown in the system of FIG. 1 including a processor circuit in accordance with various embodiments of the invention.

Referring to FIG. 3, a schematic view of the user monitoring server 13 shown in FIG. 1 according to one embodiment is shown. In the embodiment shown, the user monitoring server 13 includes a processor circuit including a user monitoring processor 100 and a program memory 102, a storage memory 104, and an input/output (I/O) interface 106 all of which are in communication with the user monitoring processor 100.

The I/O interface 106 includes an interface 112 for communicating with devices via the network 20 and an interface 116 for communicating with devices via the network 21

Program codes for directing the user monitoring processor 100 to carry out various functions are stored in the program memory 102. In various embodiments, the program memory 102 may include a block of codes 120 for directing the user monitoring server 13 to effect user monitoring functions. The block of codes 120 may define a user monitoring application. In this specification, it may be stated that certain encoded entities such as applications perform certain functions. Whenever an application or encoded entity is described as taking an action, as part of, for example, a function or a method, it will be understood that a processor (e.g. the user monitoring processor 100) is directed to take the action by way of programmable codes or processor readable instructions defining or forming part of the application and/or cause another component, for example a part of the system 10, to take the action.

The storage memory 104 includes a plurality of storage locations including location 130 for storing user registration information, location 132 for storing user ticket information, location 136 for storing information request data, location 138 for storing requested user information, and location 140 for storing person of interest user information. In various embodiments, the plurality of storage locations may be stored in a database in the storage memory 104.

Monitoring Station—Processor Circuit

Figure 4:
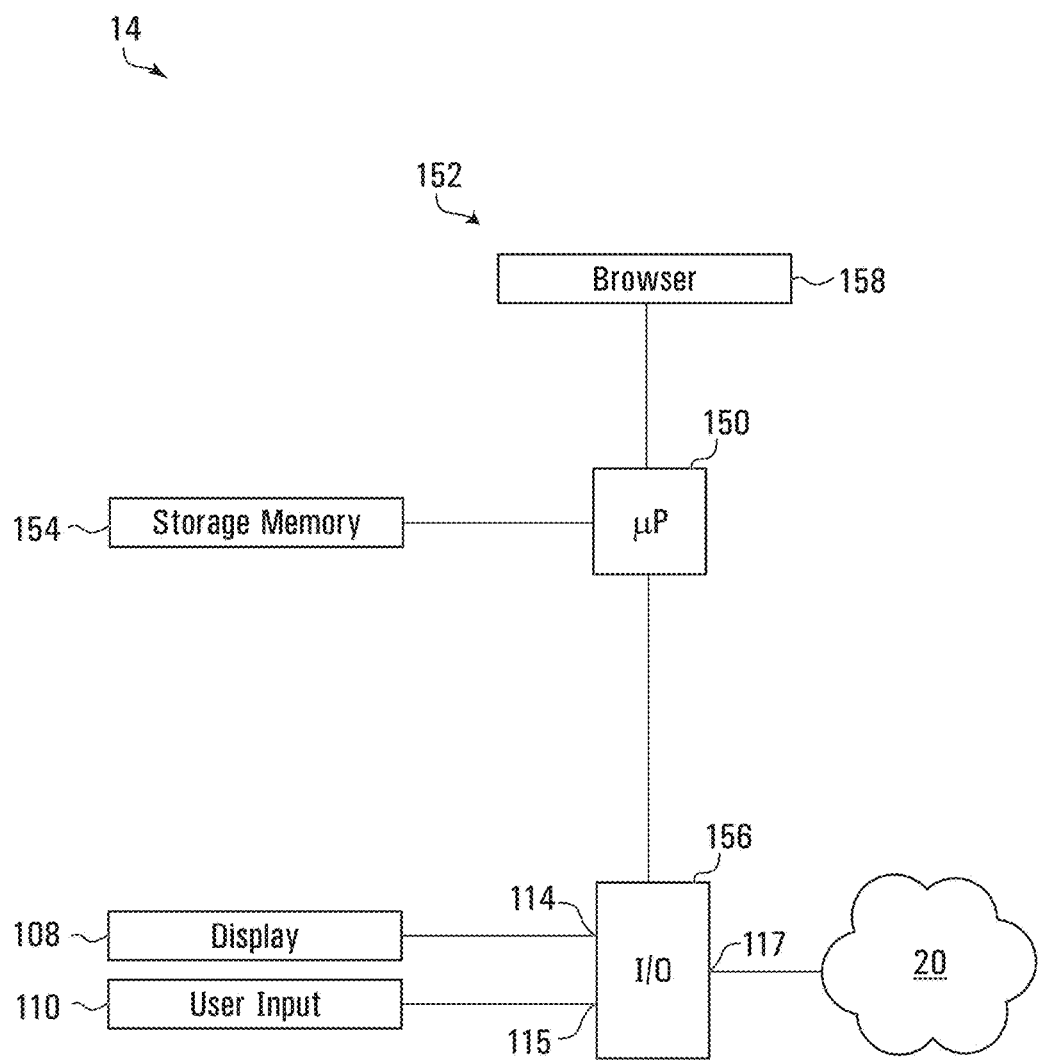
FIG. 4 is a schematic view of a monitoring station shown in the system of FIG. 1 including a processor circuit in accordance with various embodiments of the invention.

Referring to FIG. 4, a schematic view of the monitoring station 14 shown in FIG. 1 according to one embodiment is shown. In the embodiment shown, the monitoring station 14 includes a processor circuit including a monitoring station processor 150 and a program memory 152, a storage memory 154, and an input/output (I/O) interface 156 all of which are in communication with the monitoring station processor 150. The monitoring station 14 also includes a display 108, and user input devices 110, which may include a pointing device such as a mouse and/or a keyboard, for example.

The I/O interface 156 includes an interface 114 for communicating with the display 108 and an interface 115 for communicating with the user input devices 110. The I/O interface 156 also includes an interface 117 for communicating with devices via the network 20.

Program codes for directing the monitoring station processor 150 to carry out various functions are stored in the program memory 152. In various embodiments, the program memory 152 may include a block of codes 158 for directing the monitoring station 14 to effect browser functions. In various embodiments, the browser functions may facilitate access to functionality provided by the user monitoring server 13, the location monitoring server 15, the person of interest server 17, and/or the video management server 19 shown in FIG. 1.

Location Monitoring Server—Processor Circuit

Figure 5:
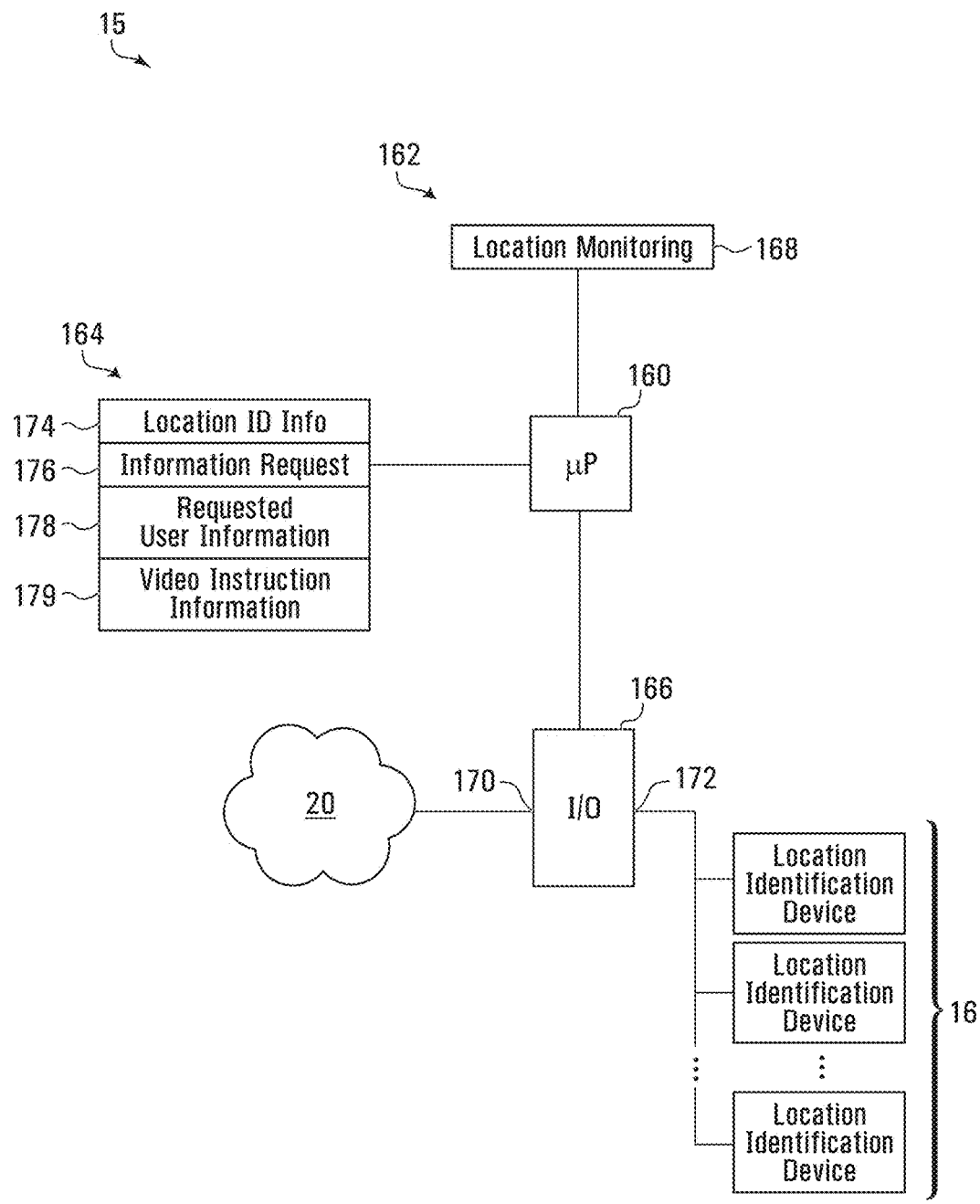
FIG. 5 is a schematic view of a location monitoring server shown in the system of FIG. 1 including a processor circuit in accordance with various embodiments of the invention.

Referring to FIG. 5, a schematic view of the location monitoring server 15 shown in FIG. 1 according to one embodiment is shown. In the embodiment shown, the location monitoring server 15 includes a processor circuit including a location monitoring processor 160 and a program memory 162, a storage memory 164, and an input/ output (I/O) interface 166 all of which are in communication with the location monitoring processor 160.

The I/O interface 166 includes an interface 170 for communicating with devices via the network 20 and an interface 172 for communicating with the location identification devices 16.

Program codes for directing the location monitoring processor 160 to carry out various functions are stored in the program memory 162. In various embodiments, the program memory 162 may include a block of codes 168 for directing the location monitoring server 15 to effect location monitoring functions. The block of codes 168 may define a location monitoring application.

The storage memory 104 includes a plurality of storage locations including location 174 for storing location identification information, location 176 for storing information request information, and location 178 for storing requested user information, and location 179 for storing video instruction information.

Person of Interest Server—Processor Circuit

Figure 6:
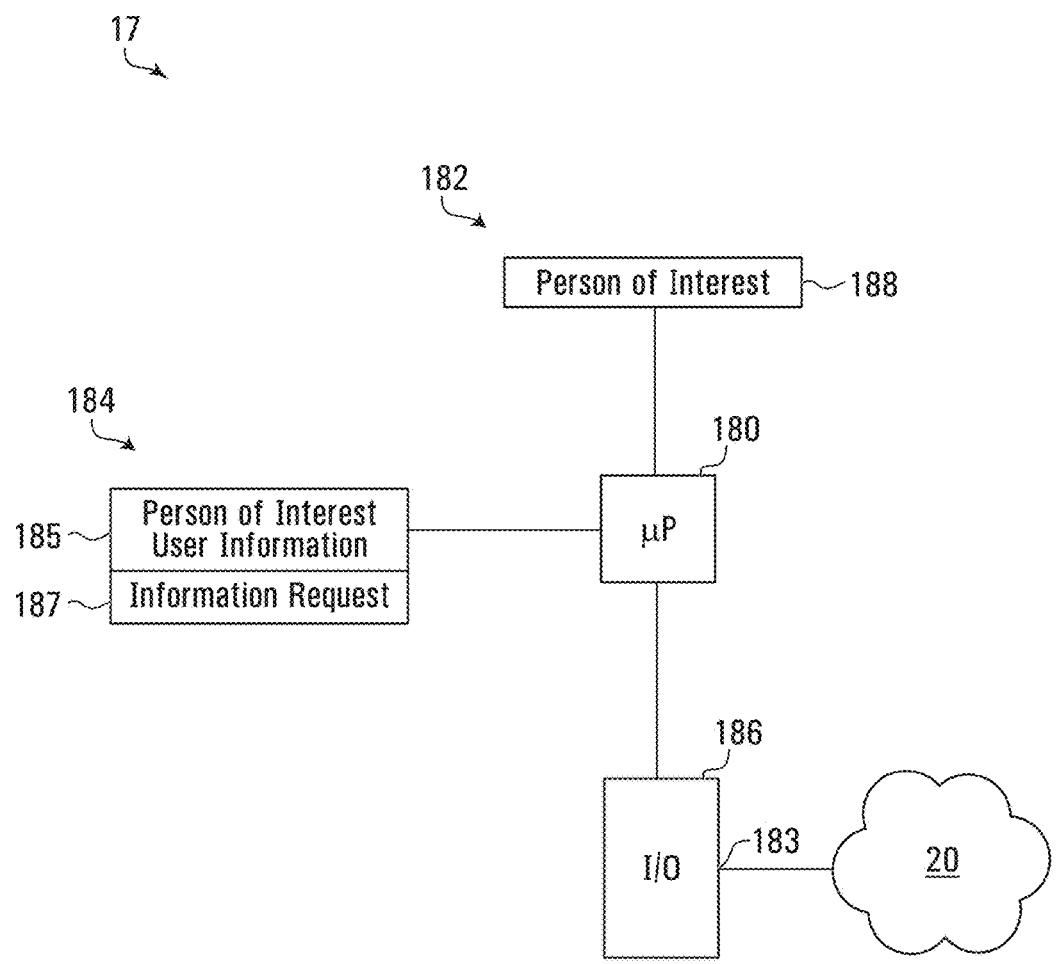
FIG. 6 is a schematic view of a person of interest server shown in the system of FIG. 1 including a processor circuit in accordance with various embodiments of the invention.

Referring to FIG. 6, a schematic view of the person of interest server 17 shown in FIG. 1 according to one embodiment is shown. In the embodiment shown, the person of interest server 17 includes a processor circuit including a person of interest processor 180 and a program memory 182, a storage memory 184, and an input/output (I/O) interface 186 all of which are in communication with the person of interest processor 180.

The I/O interface 186 includes an interface 183 for communicating with devices via the network 20.

Program codes for directing the person of interest processor 180 to carry out various functions are stored in the program memory 182. In various embodiments, the program memory 182 may include a block of codes 188 for directing the person of interest server 17 to effect person of interest functions. The block of codes 188 may define a person of interest application.

The storage memory 184 includes a plurality of storage locations including location 185 for storing person of interest user information and a location 187 for storing information request data.

Video Management Server—Processor Circuit

Figure 7:
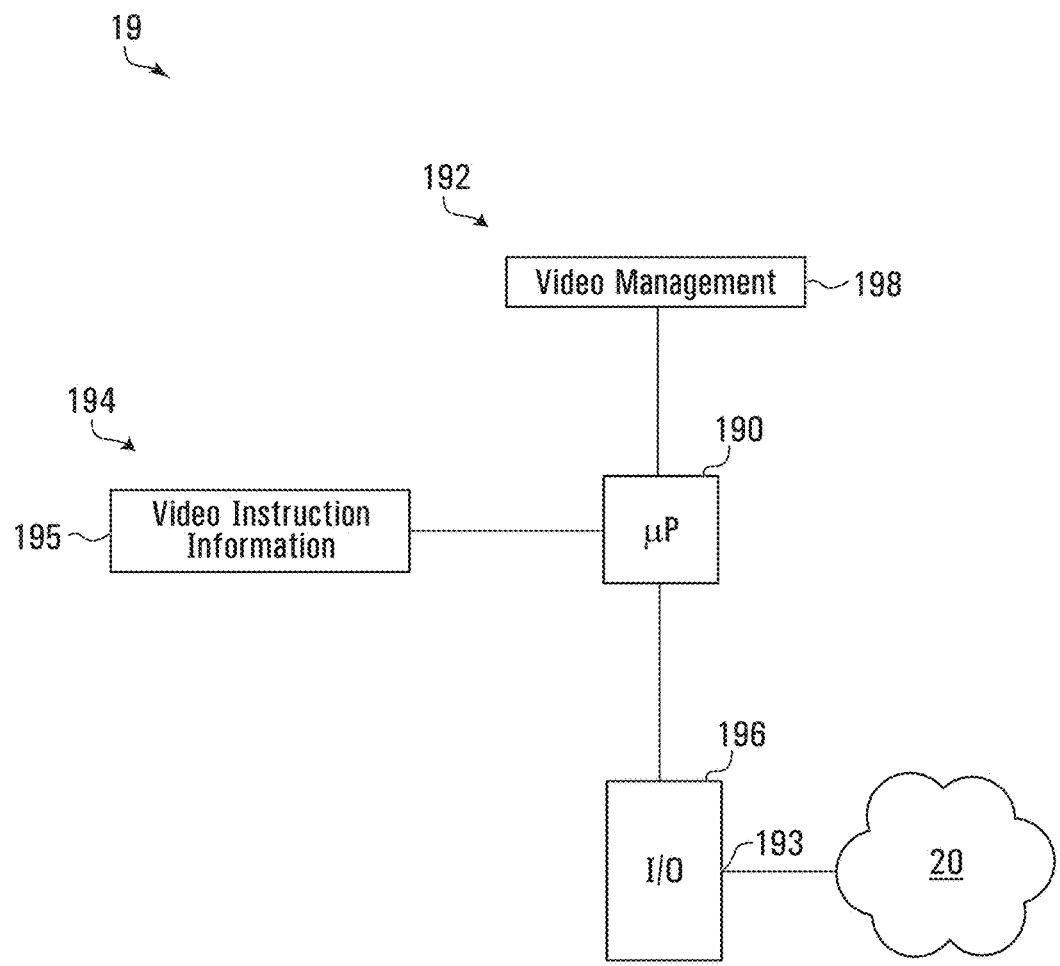
FIG. 7 is a schematic view of a video management server shown in the system of FIG. 1 including a processor circuit in accordance with various embodiments of the invention.

Referring to FIG. 7, a schematic view of the video management server 19 shown in FIG. 1 according to one embodiment is shown. In the embodiment shown, the video management server 19 includes a processor circuit including a video management processor 190 and a program memory 192, a storage memory 194, and an input/output (I/O) interface 196 all of which are in communication with the video management processor 190.

The I/O interface 196 includes an interface 193 for communicating with devices via the network 20.

Program codes for directing the video management processor 190 to carry out various functions are stored in the program memory 192. In various embodiments, the program memory 192 may include a block of codes 198 for directing the video management server 19 to effect video management functions. The block of codes 198 may define a video management application.

The storage memory 194 includes a plurality of storage locations including location 195 for storing video instruction information.

Registration

Figure 8:
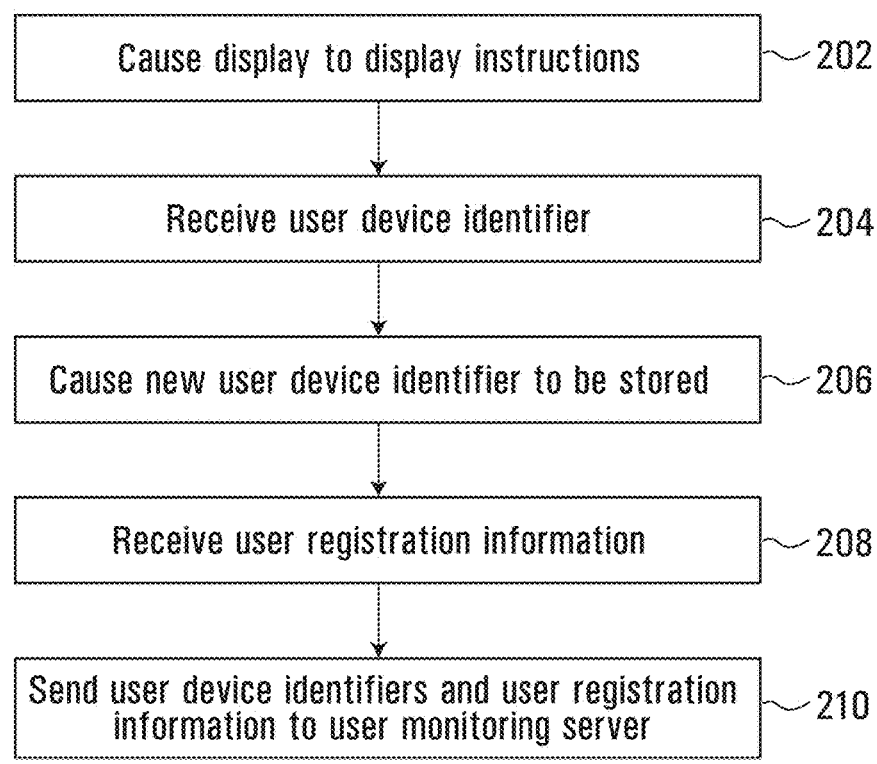
FIG. 8 is a flowchart depicting blocks of code for directing the registration device of the system of FIG. 1 to perform registration functions in accordance with various embodiments of the invention.

As discussed above, in various embodiments, the registration device 12 shown in FIG. 1 may be used by users or attendees to an event. Referring to FIG. 8, a flowchart depicting blocks of code for directing the registration device processor 40 shown in FIG. 2 to perform registration functions in accordance with one embodiment is shown generally at 200. The flowchart 200 may be encoded in the block of codes 60 shown in FIG. 2 for example.

Referring to FIG. 8, the flowchart 200 begins with block 202 which directs the registration device processor 40 shown in FIG. 2 to cause the display 50 to display instructions for registration. For example, in various embodiments, block 202 may direct the registration device processor 40 to produce and transmit signals to the display 50 via the interface 86 to cause the display 50 to display instructions that indicate to a user that they should scan their ticket over the RFID reader and writer 45, scan an identification document over the image scanner 48, and stand in front of the camera 46.

Block 204 directs the registration device processor 40 to receive a user device or ticket identifier. For example, in various embodiments, a first user may scan their ticket over the RFID reader and writer 45 and the registration device processor 40 may receive a transponder ID ("TID") via the interface 81 from the RFID reader and writer 45, which receives the TID from an RFID tag on the user's ticket. The TID may be unique to each ticket issued for the event and may act as a ticket identifier.

Block 204 may direct the registration device processor 40 to store the TID in memory. For example, block 204 may direct the registration device processor 40 to generate a user registration record, such as user registration record 250 shown in FIG. 9, and to store the user registration record 250 in the location 70 of the storage memory 44 shown in FIG. 2. Referring to FIG. 9, the user registration record 250 includes a TID field 252 for storing the TID received at block 204, which may be a 24 character HEX value. In one embodiment, block 204 may direct the registration device processor 40 to store the received TID in the TID field 252 of the user registration record 250 as shown in FIG. 9 and to store the user registration record 250 in the location 70 of the storage memory 44.

Referring to FIG. 9, the user registration record 250 also includes a timestamp field 254 for storing a text representation of a time at which registration occurred, a gate ID field 256 for storing an identifier for identifying the registration device 12, a site ID field 258 for storing an identifier for identifying the site at which the registration device 12 is located, an electronic product code ("EPC") field 260 for storing an EPC, which may be a 24 character HEX value, and may act as a ticket identifier, a face capture field 262 for storing a representation of one or more images representing the user, a document scan field 264 for storing a representation of an image of an identification document presented by the user, and a registration processing time field 266 for storing a representation in seconds of the amount of time taken to complete registration. Each of the fields 254-266 may be considered to store user registration information and may be initialized to a null value before being set at block 208 of the flowchart 200.

In some embodiments, it may be advantageous to cause the ticket to store or represent a new ticket identifier. For example, in some embodiments, the location identification devices 16 as shown in FIG. 1 may not be configured to read TIDs but may be configured to read another identifier, such as an EPC from the ticket and so the registration device may be configured to write a new EPC to the ticket, to facilitate the location identification devices 16 being able to track the location of the ticket. The new EPC may act as a new ticket identifier.

Accordingly, in some embodiments the flowchart 200 shown in FIG. 8 includes block 206 which directs the registration device processor 40 shown in FIG. 2 to cause a new user device identifier to be stored in the ticket provided by the user. In some embodiments block 206 may direct the registration device processor 40 to produce and transmit signals to the RFID reader and writer 45 via the interface 81 of the I/O interface 52 to cause the RFID reader and writer to write a unique new value into an EPC field of the RFID tag of the ticket.

In some embodiments, to help to ensure that the EPCs are distinguishable from other EPC numbers in other RFID tags that may be at the event, the EPCs may be given a unique preamble. In one embodiment, an EPC value may be determined by concatenating the month, day and year, adding hour, minutes and seconds to the end, adding a gate identifier, which may be three digits that range from 000-999, adding a site identifier, which may be two digits ranging from 00-99 and prepending a padding of "C" characters to the front of the EPC to fill out the remaining characters. An exemplary EPC that may be generated according to one embodiment may be: "CCCCC0624201508233400101". In some embodiments, the EPCs may include randomly generated values or a value that is incremented from zero onwards, for example. Block 206 may direct the registration device processor 40 to set the EPC field 260 to the EPC value written to the RFID tag of the ticket or device. The EPC stored in the EPC field 260 may act as a user device identifier.

In some embodiments, for example, where the identifier received at block 204 is sufficient for determining location of the tickets (e.g. where the identifier received is unique and readable by the location identification devices 16), block 206 may be omitted.

Referring back to FIG. 8, block 208 directs the registration device processor 40 shown in FIG. 2 to receive user registration information. Block 208 may direct the registration device processor 40 to store the user registration information in the user registration record 250 shown in FIG. 9, for example.

In one embodiment, block 208 may direct the registration device processor 40 to set the timestamp field 254 to a representation of a current time. Block 208 may direct the registration device processor 40 to set the gate ID field 256 to a predetermined unique identifier associated with the registration device 12. In various embodiments, the value of the gate ID field may be used to differentiate between registration devices when the registration device 12 is one of a plurality of registration devices. Block 208 may direct the registration device processor 40 to read from the storage memory a site identifier, which may have been previously set by an administrator, for example, and to set the site ID field 258 to the site identifier.

Referring to FIG. 8, block 208 may direct the registration device processor 40 shown in FIG. 2 to produce signals for communicating with the camera 46 via the interface 82 of the I/O interface 52 to cause the camera 46 to capture one or more images of the user who is using the registration device 12. Block 208 may direct the registration device processor 40 to receive image data representing the one or more images of the user from the camera 46 via the interface 82 of the I/O interface 52. Block 208 may then direct the registration device processor 40 to cause the face capture field 262 of the user registration record 250 shown in FIG. 9 to store a representation of the one or more images received. In some embodiments, representations of images may be stored as uniform resource identifiers (URIs) which point to a location where the image is stored.

Block 208 may direct the registration device processor 40 to produce signals for communicating with the image scanner 48 via the interface 84 of the I/O interface 52 to cause the image scanner 48 to capture one or more images of an identification document of the user who is using the registration device 12. For example, the identification document may include a government identification card or document, a license, a passport, another type of identification and/or any combination thereof. Block 208 may direct the registration device processor 40 to receive image data representing one or more images of the document from the image scanner 48 via the interface 84 of the I/O interface 52. Block 208 may then direct the registration device processor 40 to cause the document scan field 264 of the user registration record 250 shown in FIG. 9 to store a representation of the one or more images received.

In various embodiments, the registration information may include additional or alternative information. For example, in some embodiments, the registration device 12 may be configured to receive additional or alternative biometric information from the user, such as, for example, fingerprint, iris, retina, and/or mugshot information and the registration information may include one or more representations of the biometric information. When all other user registration information has been received and stored, block 208 may direct the registration device processor 40 to set the registration processing time field 266 to represent a total processing time from first scanning of the ticket to reception and storage of the final piece of registration information. The registration processing time may be used by administrators to analyze and/or improve efficiency of the registration device 12, for example.

Referring to FIG. 8, block 210 then directs the registration device processor 40 shown in FIG. 2 to send the user device identifiers and the user registration information to the user monitoring server 13 shown in FIG. 3. In various embodiments, block 210 may direct the registration device processor 40 to send a representation of the user registration record 250 shown in FIG. 9 to the user monitoring server 13 via the network 20 and the interface 80 of the I/O interface 52 shown in FIG. 2. In some embodiments, for example, block 508 may direct the location monitoring application to send the user registration record 250 in a message using JSON, XML which may use a RESTful interface, or another method or format for passing information between applications or devices, for example. Generally in various embodiments where an application or device is described herein as sending or providing information to another application or device, the information may be sent using a similar method and/or format to that described above.

In various embodiments, the flowchart 200 and other flowcharts described herein may be repeated for each user or attendee at the event. Accordingly, having regard to the flowchart 200, for each attendee, their ticket may be scanned, their identification document may be scanned, and their picture may be taken and a user registration record generally similar to the user registration record 250 may be generated and sent to the user monitoring server 13. In various embodiments, blocks generally similar to those shown in the flowchart 200 may be executed and repeated by each of a plurality of registration devices generally similar to the registration device 12, such that each registration device generates and sends user registration records to the user monitoring server 13.

User Monitoring

Figure 10:
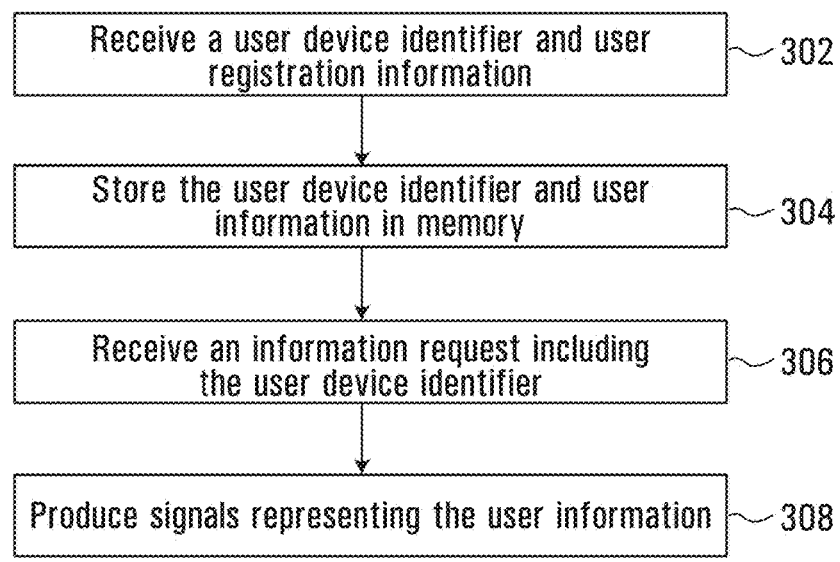
FIG. 10 is a flowchart depicting blocks of code for directing the user monitoring server of the system of FIG. 1 to perform user monitoring functions in accordance with various embodiments of the invention.

As discussed above, in various embodiments, the system 10 shown in FIG. 1 may be configured to facilitate monitoring of at least one user of a plurality of users. Referring to FIG. 10, a flowchart depicting blocks of code for directing the user monitoring processor 100 shown in FIG. 3 to perform user monitoring functions in accordance with one embodiment is shown generally at 300. The flowchart 300 may be encoded in the block of codes 120 shown in FIG. 3 for example. Accordingly, the flowchart 300 may be considered to be executed by the user monitoring application defined by the block of codes 120.

Referring to FIG. 10, the flowchart 300 begins with block 302 which directs the user monitoring processor 100 shown in FIG. 3 to receive a user device identifier and user registration information, the user device identifier for identifying a device associated with a user and the user registration information associated with the user. For example, in various embodiments, block 302 may direct the user monitoring processor 100 to receive a representation of the user registration record 250 shown in FIG. 9 from the registration device 12 via the network 20 and the interface 112 of the I/O interface 106 shown in FIG. 3. The user registration record 250 may have been sent at block 210 of the flowchart 200 shown in FIG. 8.

In some embodiments, since the values of the TID field 252 and the EPC field 260 of the user registration record 250 shown in FIG. 9 are each unique for each device or ticket, the values of either or both of the fields 252 and 260 may act as a user device identifier. The information included in the other fields 254, 256, 258, 262, 264, and 266 may act as user registration information.

Referring to FIG. 10, block 304 directs the user monitoring processor 100 shown in FIG. 3 to store in memory the received user device identifier and user information including the received user registration information. In various embodiments, block 304 may direct the user monitoring processor 100 to store a representation of the user registration record 250 in the location 130 of the storage memory 104.

In some embodiments, block 304 may direct the user monitoring processor 100 to include additional information in the user information. For example, in various embodiments block 304 may direct the user monitoring processor 100 to request and receive from the user information server 18, additional information associated with the user device identifier. The additional information may include biographical information, for example. In such embodiments, block 304 may include blocks of codes as shown at 350 in FIG. 11.

Figure 11:
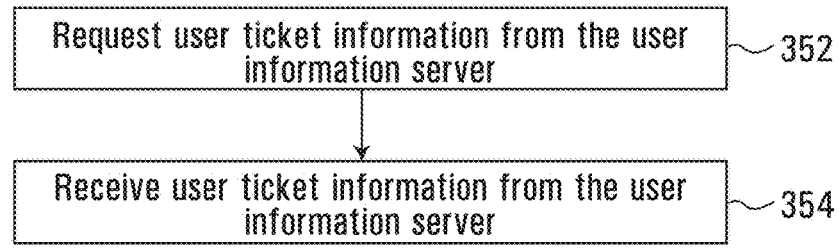
FIG. 11 is a flowchart depicting blocks of code which may be included in the blocks of code shown in FIG. 10 in accordance with various embodiments of the invention.

Referring to FIG. 11, the blocks of code 350 begin with block 352 which directs the user monitoring processor 100 shown in FIG. 3 to request user ticket information from the user information server 18. In some embodiments, block 352 may direct the user monitoring processor 100 to transmit a request message including the TID from the user information record 250 to the user information server 18 via the network 21 and the interface 116 of the I/O interface 106 shown in FIG. 3.

In various embodiments, the user information server 18 may maintain in memory a database including a user ticket information record for each ticket, with each user ticket information record including or associated with a unique TID. The user information server 18 may be configured to, upon receiving the request message including the TID, look up a user ticket information record including the TID and transmit the user ticket information record to the user monitoring server 13. An exemplary user ticket information record in accordance with one embodiment is shown at 400 in FIG. 12.

The user ticket information record includes a TID field 402 for storing a transponder ID, which may act as a ticket identifier, a ticket number field 404 for storing a ticket number which may act as a ticket identifier, a name field 406 for storing a first name of a ticket purchaser, a surname field 408 for storing a last name of a ticket purchaser, a gate field 410 for storing a gate identifier associated with the ticket, a row field 412 for storing a row number associated with the ticket, a seat field for storing a seat number associated with the ticket, a barcode field 416 for storing a barcode identifier on the ticket, an account numbers field 420 for storing account numbers associated with the ticket purchaser, a passport ID field 426 for storing a passport identifier for the purchaser, a date of birth field 428 for storing a date of birth of the purchaser, a session description field 430 for storing a description of the event, a session code field 432 for storing a code identifying the event, a nationality field 436 for storing a nationality of the purchaser, a gender field 438 for storing a gender of the ticket purchaser, a passport expiry date field 440 for storing a passport expiry date for the ticket purchaser, an address field 442 for storing an address of the ticket purchaser, a postal code field 444 for storing a postal code of the ticket purchaser, a city field 446 for storing a city of the ticket purchaser, a country field 448 for storing a country of residence of the ticket purchaser, a phone number field 450 for storing one or more phone numbers for the ticket purchaser, and an email field 452 for storing an email of the ticket purchaser. In various embodiments, the user ticket information record 400 may include fewer or additional fields which may be provided by a ticket vendor, for example.

Referring to FIG. 11, block 354 then directs the user monitoring processor 100 shown in FIG. 3 to receive user ticket information from the user information server 18. Block 354 may direct the user monitoring processor 100 to receive the user ticket information record 400 from the user information server 18 via the network 21 and the interface 116 of the I/O interface 106 shown in FIG. 3 and to store the user ticket information record 400 in the location 132 of the storage memory 104 shown in FIG. 3. The user ticket information record 400 and the user registration record 250 may be associated in memory by way of the common TID field value and the information included in the records 250 and 400 may act as user information.

Referring back to FIG. 10, in accordance with various embodiments, after block 304 has been executed, user device identifiers and user information included in the user registration record 250 and the user ticket information record 400 are stored in the locations 130 and 132 of the storage memory 104 of the user monitoring server 13 shown in FIG. 3. In some embodiments, a plurality of blocks generally similar to blocks 302 and 304 may be executed with respect to a plurality of user registration records transmitted by one or more registration devices to cause the user monitoring processor 100 to store a plurality of user registration records and user ticket information records in the storage memory 104.

In various embodiments, the flowchart 300 may wait or not continue at block 306 until an information request is received. In some embodiments, the information request may be received from the location monitoring server 15 after the location monitoring server executes a flowchart 500 as shown in FIG. 13, and described below.

Figures 13, 14:
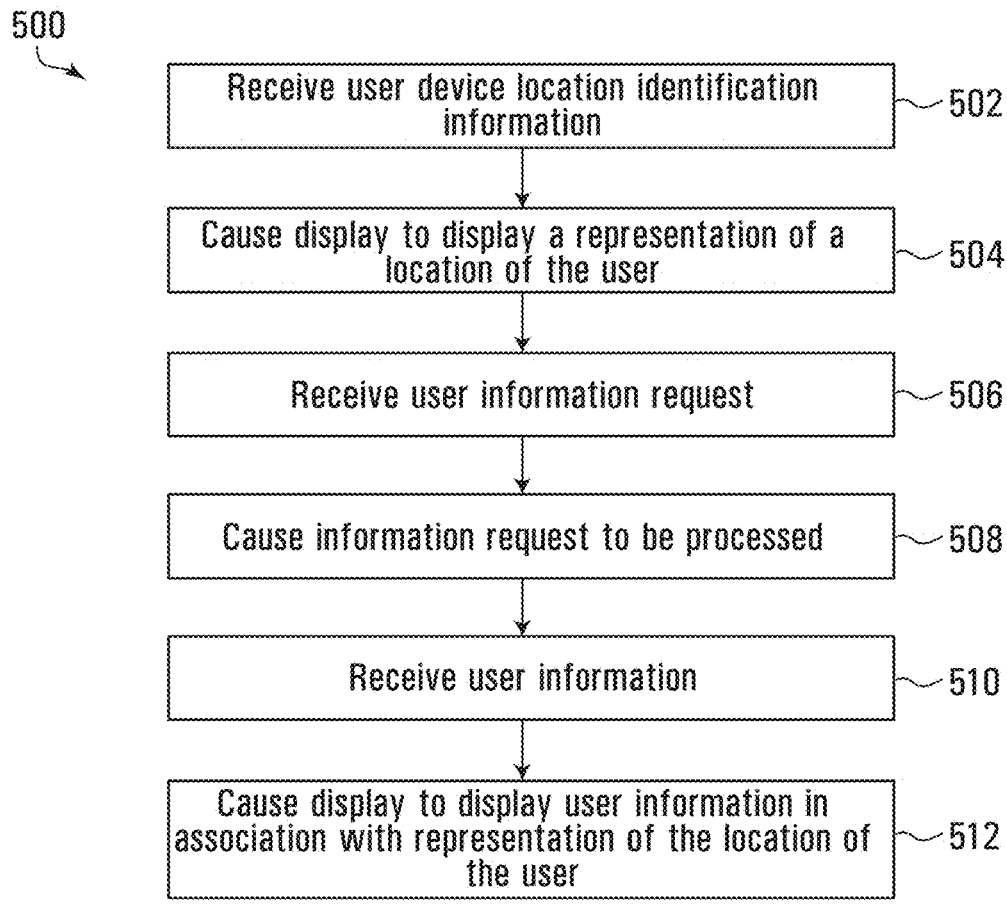
FIG. 13 is a flowchart depicting blocks of code for directing the location monitoring server of the system of FIG. 1 to perform location monitoring functions in accordance with various embodiments of the invention.
FIG. 14 is a representation of an exemplary location identification record that may be used in the system shown in FIG. 1.

Referring now to FIG. 13, a flowchart depicting blocks of code for directing the location monitoring processor 160 shown in FIG. 5 to perform location monitoring functions in accordance with one embodiment is shown generally at 500. The flowchart 500 may be encoded in the block of codes 168 shown in FIG. 5 for example. Accordingly, the flowchart 500 may be considered to be executed by the location monitoring application defined by the block of codes 168.

A monitoring user or security person using the monitoring station 14 may use the browser application to interact with and/or initiate the location monitoring application and cause the flowchart 500 to be executed, which may allow the security person to monitor locations of various user tickets or devices and thereby monitor locations of users at the event location.

Referring to FIG. 13, the flowchart 500 begins with block 502 which directs the location monitoring processor 160 shown in FIG. 5 to receive user device location identification information. In one embodiment, block 502 may direct the location monitoring processor 160 to receive location identification information from one or more of the location identification devices 16 via the interface 172 of the I/O interface 166 shown in FIG. 5. For example, block 502 may direct the location monitoring processor 160 to receive a first user device location identification record 650, as shown in FIG. 14, from a first location identification device of the location identification devices 16.

Referring to FIG. 14, the location identification record 650 includes an EPC field 652 for storing an EPC which was determined by scanning a ticket proximate the first location identification device, a timestamp field 654 for storing a time at which the ticket was scanned by the first location identification device, and a location identification device identifier field 656 for storing an identifier for identifying the first location identification device which scanned the ticket. As described above, the location identification devices 16 shown in FIG. 1 may be positioned at entrances to zones at the event and may scan RFID tags of tickets to obtain an EPC associated with the ticket when the tickets are near. Accordingly, the first location identification device may be associated with a zone or location and therefore the value stored in the location identification device identifier field 656 may be used to identify a last known location of a ticket having the corresponding EPC and therefore may act as a location identifier.

In some embodiments, block 502 may direct the location monitoring processor 160 to store the received location identification record 650 in the location 174 of the storage memory 164 shown in FIG. 5. In various embodiments, block 502 may be run repeatedly and/or continuously, to direct the location monitoring processor 160 to receive numerous location identification records generally similar to the location identification record 650 and associated with the same and/or different user tickets to repeatedly update locations of the user tickets. In some embodiments, block 502 may direct the location monitoring processor 160 to store corresponding location identification device and timestamp information in a record or table for each ticket identifier, to depict a history of locations for each user.

Referring to FIG. 13, block 504 directs the location monitoring processor 160 shown in FIG. 5 to cause the display 108 of the monitoring station 14 shown in FIG. 4 to display a representation of a location of the user. In some embodiments, block 504 may direct the location monitoring processor 160 to produce and transmit a message to the monitoring station 14 via the interface 170 and the network 20 to cause the browser application of the monitoring station 14 to produce and transmit signals via the interface 114 to the display 108 to cause the display 108 to depict a representative diagram or map of an area at which the event is taking place. An exemplary representation of a map which may be depicted by the display 108 is shown at 550 in FIG. 15. In the embodiment shown, the map 550 depicts an arena having zones 552-606, wherein the zones 552-582 depict seating areas and the zones 584-606 depict rooms, such as, for example, restrooms or conference rooms in the arena.

Figures 15, 16:
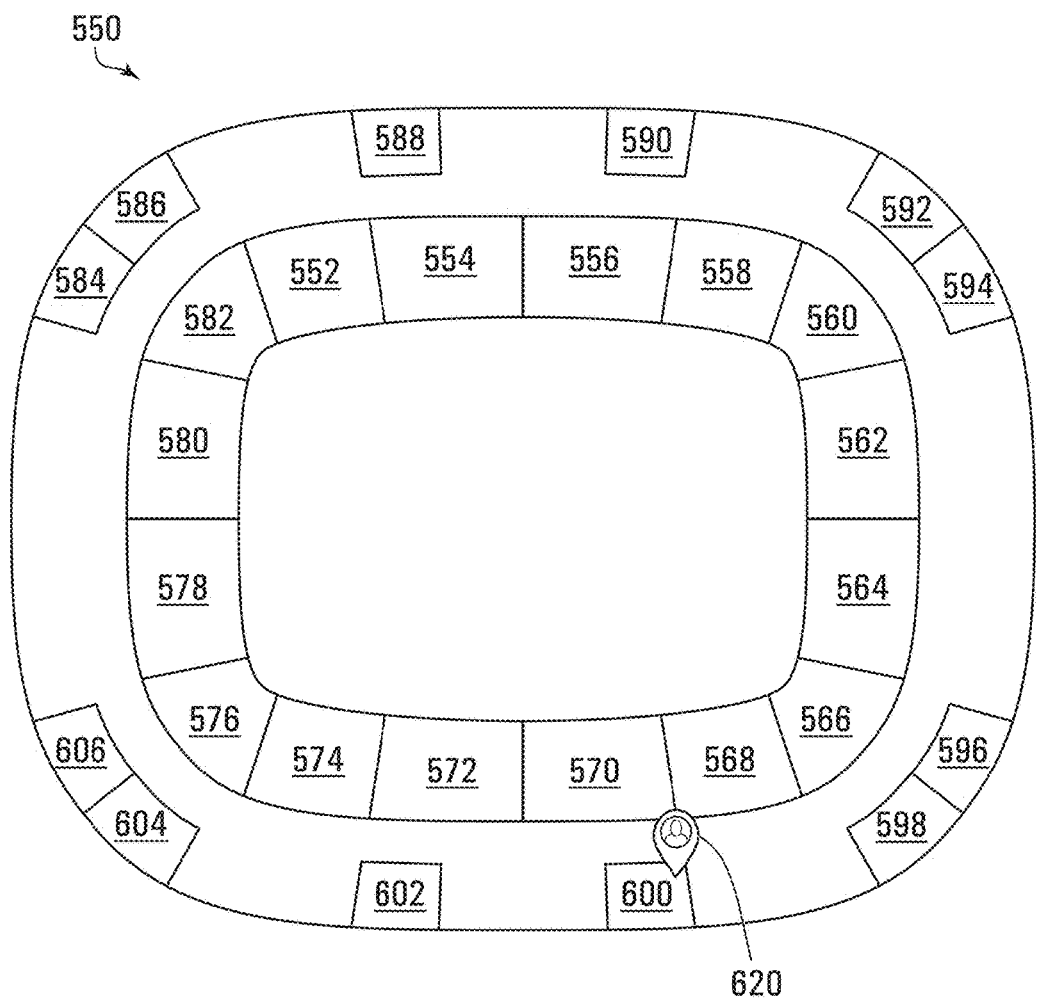
FIG. 15 is a representation of an exemplary display that may be displayed by a display of the monitoring station shown in FIG. 4.
FIG. 16 is a representation of an exemplary information request record that may be used in the system shown in FIG. 1.

Referring to FIG. 13, block 504 may direct the location monitoring processor 160 shown in FIG. 5 to send messages to the monitoring station 14 via the network 20 and the interface 170 to cause the display 108 of the monitoring station 14 shown in FIG. 4 to display an icon 620 as shown in FIG. 15 in association with a zone that corresponds to the location identification device identified by the identifier stored in the device identifier field 656 of the most recently timestamped location identifier record. In the embodiment shown, the first location identification device identified by the identifier of "30" is located at the entrance of the zone 600 and so block 504 directs the location monitoring processor 160 to send messages to the monitoring station 14 to cause the display 108 to display the icon 620 in the zone 600.

In some embodiments, block 504 may direct the location monitoring processor 160 to cause the display 108 of the monitoring station 14 to display a plurality of indicators or icons showing locations of a plurality of users.

In some embodiments, a monitoring user may wish to see user information or details regarding a particular user and so the monitoring user may use a pointing device of the user input devices 110 to select the icon 620 shown in FIG. 15, and thereby request user information for the user associated with the icon 620. Upon selection of the icon 620, the browser application of the monitoring station 14 may send a message requesting user information to the location monitoring server 15 via the network 20 and the interface 117 of the monitoring station 14 shown in FIG. 4.

Block 506 directs the location monitoring processor 160 to receive a user information request. Block 506 may direct the location monitoring processor 160 to receive signals representing selection of the icon 620 via the network 20 and the interface 170 of the I/O interface 106. Block 506 may then direct the location monitoring processor 160 to receive or retrieve the EPC of the location identification record 650 associated with the icon 620 from the location 134 of the storage memory 104 and to generate an information request record 660 as shown in FIG. 16 including an EPC field 662 for storing the EPC value retrieved. In some embodiments, block 506 may direct the location monitoring processor 160 to store the information request record 660 in the location 136 of the storage memory 164.

Referring to FIG. 13, block 508 directs the location monitoring processor 160 shown in FIG. 5 to cause the information request to be processed. Execution of block 508 may involve the location monitoring application sending an information request to the user monitoring server 13 and thereby causing block 306 of the flowchart 300 shown in FIG. 10 to be executed. For example, block 508 may direct the location monitoring processor 160 to send the information request record 660 shown in FIG. 16 to the user monitoring server 13 via the network 20 and the interface 170 to trigger execution of block 306 by the user monitoring processor 100 shown in FIG. 3.

Referring back to FIG. 10, block 306 directs the user monitoring processor 100 to receive an information request including the user identifier. For example, as discussed above, the information request record 660 may be sent by the location monitoring server 15 and block 306 may direct the user monitoring processor 100 to receive the information request record 660 via the network 20 and the interface 112 and to store a representation of the received information request record 660 in the location 136 of the storage memory 104 shown in FIG. 3.

Block 308 then directs the user monitoring processor 100 to produce signals representing the user information associated with the information request for causing the user information to be displayed in association with a representation of a location of the first user.

Block 308 may direct the user monitoring processor 100 to look up in the locations 130 and 132 of the storage memory 104 user information associated with an EPC that corresponds to the EPC of the information request record 660 received at block 306. In some embodiments, block 308 may direct the user monitoring processor 100 to generate a requested user information record that includes at least a portion of the user information included in the user registration record 250 shown in FIG. 9 and the user ticket information record 400 shown in FIG. 12. An exemplary requested user information record in accordance with one embodiment is shown at 700 in FIG. 17. In some embodiments, block 308 may direct the user monitoring processor 100 to store the requested user information record 700 in the location 138 of the storage memory 104.

The requested user information record 700 includes a record ID field 702, an EPC field 704, an entry time field 706, a face capture field 708, a document scan field 710, an entry gate ID or registration device ID field 712, a site ID field 714, a registration time field 716, a TID field 718, a name field 720, and a surname field 722. The record ID field 702 may be unique for each requested user information record and used to identify the record. Block 308 may direct the user monitoring processor 100 to populate each of the fields 704-722 with corresponding data from the user registration record 250 and/or the user ticket information record 400.

In various embodiments, block 308 may direct the user monitoring processor 100 to send a message including the requested user information record 700 to the location monitoring server 15 via the interface 112 and the network 20 to cause the location monitoring processor 160 to execute block 510 of the flowchart 500 shown in FIG. 13.

Referring to FIG. 13, the flowchart 500 continues at block 510 which directs the location monitoring processor 160 shown in FIG. 5 to receive user information. For example, as discussed above, the requested user information record 700 shown in FIG. 17 may be sent by the user monitoring server 13 over the network 20 and block 510 may direct the location monitoring processor 160 to receive the requested user information record 700 via the network 20 and the interface 170. Block 510 may direct the location monitoring processor 160 to store the requested user information record 700 in the location 178 of the storage memory 164.

Figure 18:
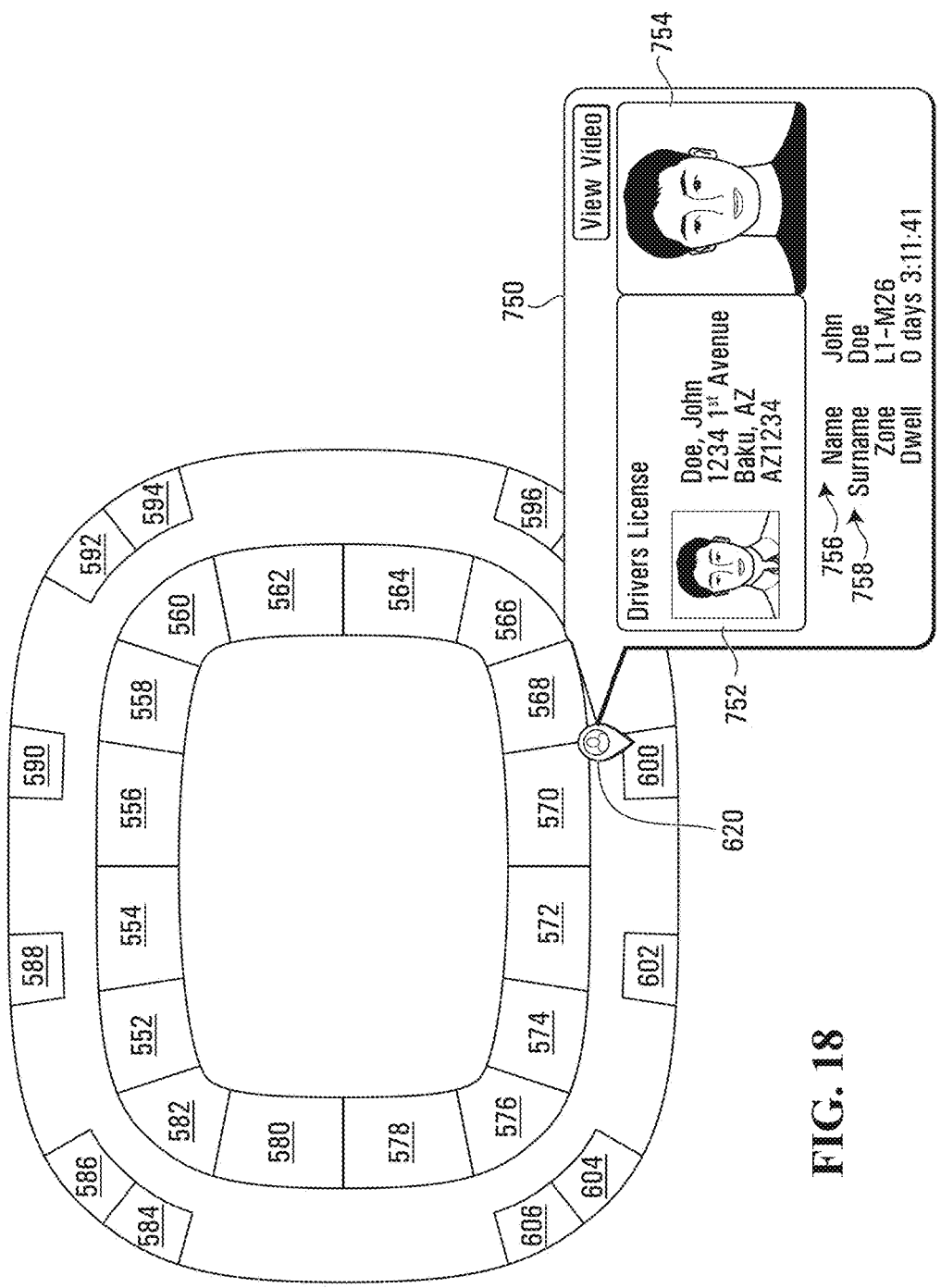
FIG. 18 is a representation of an exemplary display that may be displayed by a display of the monitoring station shown in FIG. 4.

Block 512 then directs the location monitoring processor 160 to cause the display 108 of the monitoring station 14 shown in FIG. 4 to display the user information in association with the representation of the location of the first user. In various embodiments, block 512 may direct the location monitoring processor 160 to read one or more of the fields of the requested user information record 700 and send a message including a representation of the one or more fields to the monitoring station 14 via the interface 170 and the network 20 to cause the display 108 to display a representation of the one or more fields with the map 550 and the icon 620, for example, as shown in FIG. 18. Referring to FIG. 18, in the embodiment shown, block 512 directs the location monitoring processor 160 to send a message including a representation of the information from the fields 708, 710, 720, and 722 of the requested user information record 700 to the monitoring station 14 to cause the display 108 of the monitoring station 14 to display a window 750 as shown in FIG. 18. The window 750 includes a representation 752 of an identification document taken from the contents of the document scan field 710 of the requested user information record 700 shown in FIG. 17 and a representation 754 of an image of a user taken from the contents of the face capture field 708. The window 750 also includes a name 756 and a surname 758 based on the name field 720 and the surname field 722 respectively of the requested user information record 700 shown in FIG. 17.

In some embodiments, the combination of information displayed may give a monitoring user the ability to visually identify individuals in question. The user information or biographical data associated with an individual in question may be helpful for investigative purposes, for example. In some embodiments, block 512 may direct the location monitoring processor 160 to cause the display 108 to display other location based information in the window 750 such as by way of example, a zone identifier and a dwell time, which are shown in FIG. 18.

Notably, while an exemplary embodiment has been described above and shown in the drawings, in various embodiments, any or all of the information included in the user registration record 250 shown in FIG. 9 and/or the user ticket information record 400 may be included in the requested user information record 700 and any or all of the information included in the requested user information record 700 may be displayed in the window 750.

Person of Interest

In various embodiments, the user monitoring server 13 may be used to facilitate analysis of user information. For example, the user monitoring server 13 may be used to facilitate determining whether the user information meets certain criteria to determine whether the user associated with the user information is a person of interest.

Figure 19:
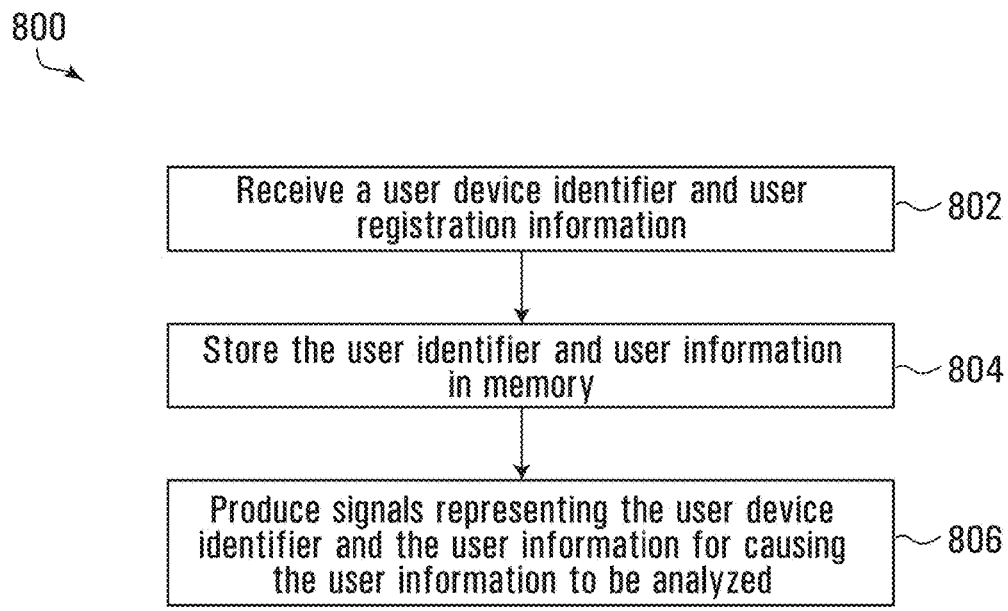
FIG. 19 is a flowchart depicting blocks of code for directing the user monitoring server of the system of FIG. 1 to perform user monitoring functions in accordance with various embodiments of the invention.

Referring to FIG. 19, a flowchart depicting blocks of code for directing the user monitoring processor 100 shown in FIG. 3 to perform user monitoring functions in accordance with one embodiment is shown generally at 800. The flowchart 800 may be encoded in the block of codes 120 shown in FIG. 3 for example. Accordingly, the flowchart 800 may be considered to be executed by the user monitoring application defined by the block of codes 120.

The flowchart 800 begins with blocks 802 and 804 which in various embodiments may be the same or generally similar to blocks 302 and 304 of the flowchart 300 shown in FIG. 10. Accordingly, after blocks 802 and 804 have been executed a registration record such as, for example, the user registration record 250 shown in FIG. 9 may be stored in the location 130 of the storage memory 104 shown in FIG. 6. In some embodiments, after blocks 802 and 804 have been executed, a user ticket information record such as, for example, the user ticket information record 400 may be stored in the location 132 of the storage memory 104.

Referring still to FIG. 19, after blocks 802 and 804 have been completed, in various embodiments the user monitoring server 13 may be configured to automatically cause the user information stored at block 804 to be analyzed. Accordingly, in various embodiments block 806 may be executed, which directs the user monitoring processor 100 shown in FIG. 5 to produce signals representing the user device identifier and the user information for causing the user information to be analyzed to determine whether the user information meets a person of interest criterion. In various embodiments, block 806 may direct the user monitoring processor 100 to generate a person of interest user information record and send the record to the person of interest server 17.

Figure 20:
FIG. 20 is a representation of an exemplary person of interest user information record that may be used in the system shown in FIG. 1.

An exemplary person of interest user information record that may be generated at block 806 in accordance with one embodiment is shown at 850 in FIG. 20. The person of interest user information record 850 includes an EPC field 852, a face capture field 854, a time field 856 and a camera ID field 858. Block 806 may direct the user monitoring processor 100 to set the EPC field 852 to the EPC from the user registration record 250 stored at block 804, to set the face capture field 854 to store a representation of the image of the user as retrieved from the face capture field of the user registration record 250, to set the time field 856 to a time representing the time at which the image of the user was taken by setting the time field 856 to the entry time from the user registration record 250 and to set the camera ID field 858 to an identifier identifying a camera with which the image of the user was taken. Since the image of the user stored in the user registration record 250 was taken by a camera of the registration device 12, block 806 may direct the user monitoring processor 100 to set the camera ID field 858 to the registration device identifier identifying the registration device 12, as taken from the user registration record 250. In some embodiments, block 806 may direct the user monitoring processor 100 to store the person of interest user information record 850 in the location 140 of the storage memory 104.

In some embodiments, the person of interest user information record 850 may include additional or fewer fields than those described above. For example, in one embodiment, the person of interest user information record 850 may include only the EPC field and the face capture field.

Block 806 may direct the user monitoring processor 100 to send a message including the person of interest user information record 850 to the person of interest server 17 via the interface 170 and the network 20 to trigger the execution by the person of interest processor 180 shown in FIG. 6 of flowchart 900 shown in FIG. 21 and discussed below.

In some embodiments, block 806 may direct the user monitoring processor 100 to cause the person of interest server 17 to initialize or create an asset including representations of the information included in the person of interest user information record 850. Block 806 may direct the user monitoring application to initialize the asset by sending XML requests to a RESTful interface of the person of interest server 17, for example. Block 806 may then direct the user monitoring processor 100 to trigger execution of flowchart 900 by sending a create job request to the person of interest server 17. For example, the create job request may be an XML request sent to a RESTful interface.

Figure 21:
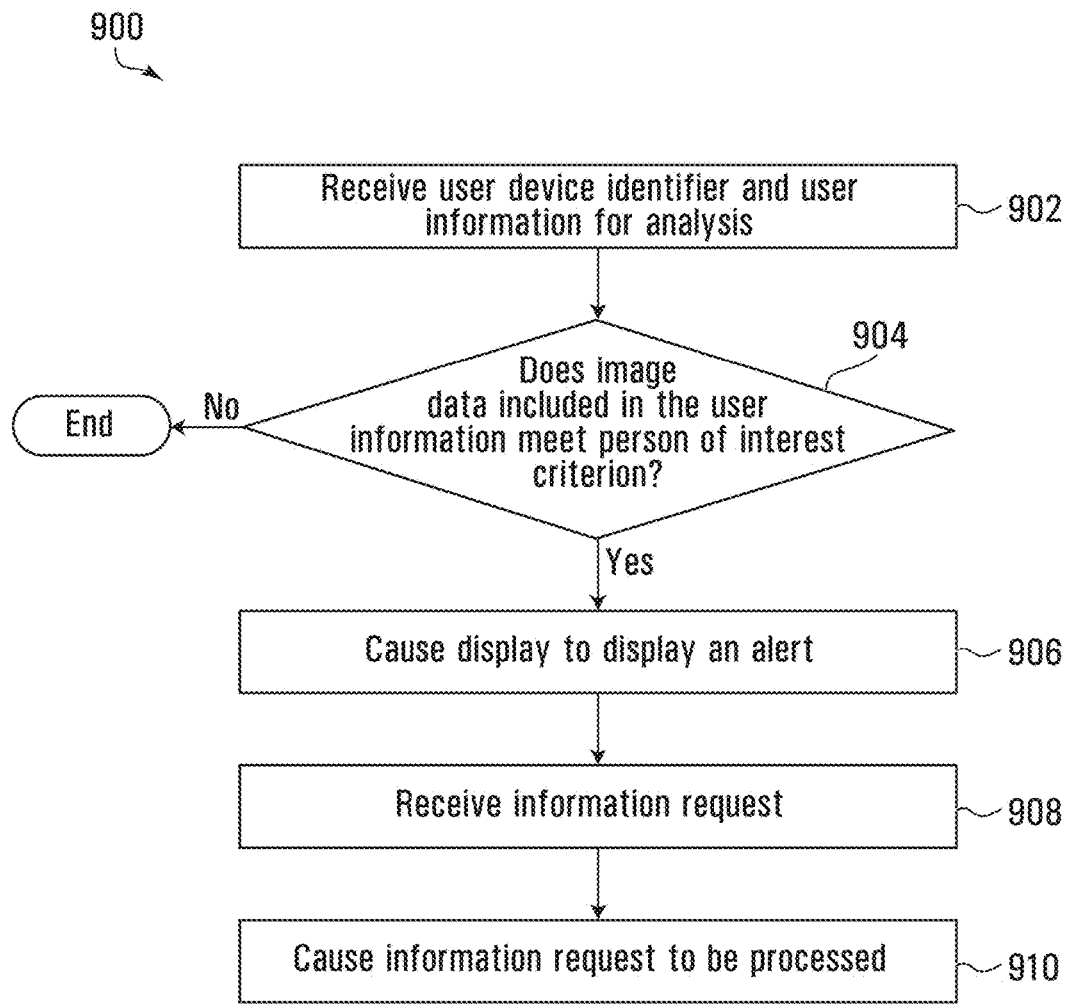
FIG. 21 is a flowchart depicting blocks of code for directing the person of interest server of the system of FIG. 1 to perform person of interest functions in accordance with various embodiments of the invention.

Referring to FIG. 21, a flowchart depicting blocks of code for directing the person of interest processor 180 shown in FIG. 6 to perform person of interest functions in accordance with one embodiment is shown generally at 900. The flowchart 900 may be encoded in the block of codes 188 shown in FIG. 6 for example. Accordingly, the flowchart 900 may be considered to be executed by the person of interest application defined by the block of codes 188.

Referring to FIG. 21, the flowchart 900 begins with block 902 which directs the person of interest processor 180 shown in FIG. 6 to receive the user device identifier and user information for analysis. Block 902 may direct the person of interest processor 180 to receive the person of interest user information record 850 shown in FIG. 20 including the user device identifier and the user information from the user monitoring server 13 via the network 20 and the interface 183, for example. Block 902 may direct the person of interest processor 180 to store the person of interest user information record 850 in the location 185 of the storage memory 184.

Block 904 then directs the person of interest processor 180 to determine whether image data included in the user information meets a person of interest criterion. Block 904 may direct the person of interest processor 180 to analyze the image represented by the contents of the face capture field 854 of the person of interest user information record 850 shown in FIG. 20 to determine if the image meets a person of interest criterion.

In some embodiments, the person of interest server 17 may have access to a set of images representing persons of interest who may be suspected terrorists, criminals, missing persons, or other persons which a monitoring user of the person of interest server 17 may wish to identify and/or closely monitor. The set of images representing the persons of interest may be stored in the storage memory 184, for example. In some embodiments, the storage memory 184 may store the images representing the persons of interest in an SSD designed for high numbers of queries. Block 904 may direct the person of interest processor 180 to compare the image represented by the face capture field 854 with the set of images representing persons of interest using biometrics to determine whether there is a match. In some embodiments block 904 may direct the person of interest processor 180 to determine a percent certainty when determining whether there is a match, and block 904 may direct the person of interest processor 180 to determine that there is a match when the percent certainty is greater than a threshold level, which may be set by an administrator. In some embodiments, for example, the threshold may be about a 75% certainty. In some embodiments, the threshold may be set by an administrator or user of the person of interest application. In some embodiments, persons of interest could be grouped in different lists with separate threshold levels.

If the image from the person of interest user information record matches a person of interest, block 904 may direct the person of interest processor 180 to determine that the person of interest user information record 850 meets the person of interest criterion and block 904 may direct the person of interest processor 180 to continue to block 906. If the image from the person of interest user information record does not match a person of interest, block 904 may direct the person of interest processor 180 to determine that the person of interest user information record 850 does not meet the person of interest criterion and block 904 may direct the person of interest processor 180 to end the process.

Figure 22:
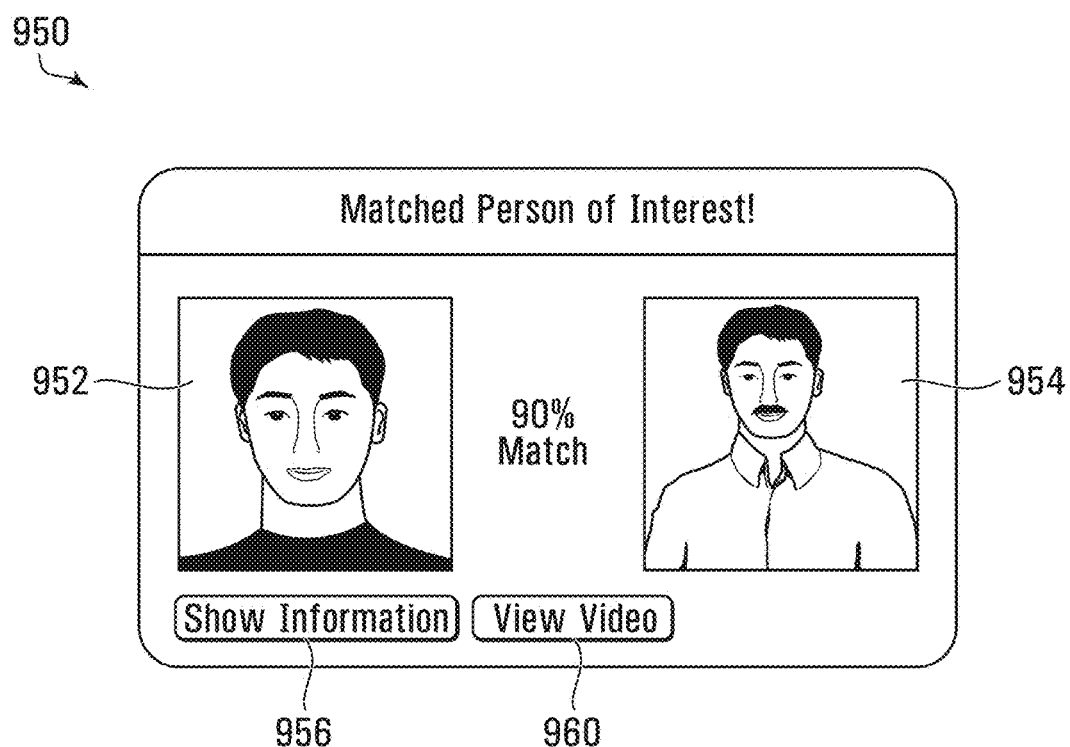
FIG. 22 is a representation of an exemplary display that may be displayed by a display of the monitoring station shown in FIG. 4.

Referring to FIG. 21, block 906 directs the person of interest processor 180 shown in FIG. 6 to cause the display 108 of the monitoring station 14 shown in FIG. 4 to display an alert. In some embodiments, block 906 may direct the person of interest processor 180 to send a message to the monitoring station 14 via the interface 183 and the network 20 to cause the monitoring station processor 150 to produce and transmit signals to the display 108 via the interface 112 of the I/O interface 106 to cause the display 108 to display an alert. For example, the message sent to the monitoring station 14 may include a representation of the image that was analyzed and a representation of the person of interest image which it was matched to, to cause the display 108 to display a window 950 as shown in FIG. 22 including a representation 952 of the image that was analyzed and a representation 954 of a person of interest image which it was matched to.

In some embodiments, block 906 may direct the person of interest processor 180 to cause the display 108 to display other information from the person of interest user information record 850, such as the time or camera ID information.

In some embodiments, the process may end after block 906. However, in various embodiments, a monitoring user viewing the window 950 may wish to see more information regarding the user who has been matched and so the monitoring user may use a pointing device of the user input devices 110 to select an information request icon 956 shown in FIG. 22. Accordingly, the process may continue at block 908 which directs the person of interest processor 180 to receive a user information request.

Referring to FIG. 21, block 908 may direct the person of interest processor 180 shown in FIG. 6 to receive a message from the monitoring station 14 shown in FIG. 4 via the network 20 and the interface 183, the message representing a monitoring user's selection of the information request icon 956. Block 908 may then direct the person of interest processor 180 to receive or retrieve the EPC of the person of interest user information record 850 associated with the selected information request icon 956 from the location 185 of the storage memory 185. Block 908 may direct the person of interest processor 180 to generate an information request record generally similar to the information request record 660 shown in FIG. 16. In some embodiments, block 908 may direct the person of interest processor 180 to store the information request record 660 in the location 187 of the storage memory 184.

Block 910 then directs the person of interest processor 180 to cause the information request to be processed. In some embodiments, block 910 may direct the person of interest processor 180 to send a message representing the information request record to the location monitoring server 15 via the interface 183 and the network 20 to trigger the location monitoring processor 160 executing block 502 or 504 of the flowchart 500 with respect to the received EPC, such that the location monitoring processor 160 sends messages to the monitoring station 14 to cause the display 108 to display a representation of a location of a user associated with the EPC.

In various embodiments, block 910 may direct the person of interest processor 180 to send an information request record including the retrieved or received EPC to the user monitoring server 13 to trigger block 306 of the flowchart 300 shown in FIG. 10 to be executed with respect to the received EPC such that blocks 306 and 308 are executed, causing the location monitoring server 15 to execute blocks 510 and 512 such that the display 108 is caused to display a map as shown in FIG. 18, for example.

While in some embodiments user input is received at block 908 of the flowchart 900 shown in FIG. 21, in various embodiments, user input may not be required and the process may automatically execute block 910 when it is determined that the image meets the person of interest criterion.

Video Management

In some embodiments, a monitoring user may wish to view video associated with a user. For example, a monitoring user may view the map 550 shown in FIG. 18, for example, and wish to view a video of the user depicted in the window 750. Accordingly, the user may select a video request icon 780 using the user input devices 110 and the monitoring station 14 may send a message to the location monitoring server 15 via the interface 117 and the network 20 to cause a flowchart 1000 shown in FIG. 23 to be executed by the location monitoring processor 160.

The flowchart 1000 depicts blocks of code for directing the location monitoring processor 160 shown in FIG. 5 to perform location monitoring functions in accordance with one embodiment, may be executed. In one embodiment, the flowchart 1000 may be encoded in the block of codes 168 shown in FIG. 5 for example and may be executed after block 512 of the flowchart 500 shown in FIG. 13. Accordingly in one embodiment, the flowchart 1000 may be considered to be executed by the location monitoring application defined by the block of codes 168.

Figure 23:
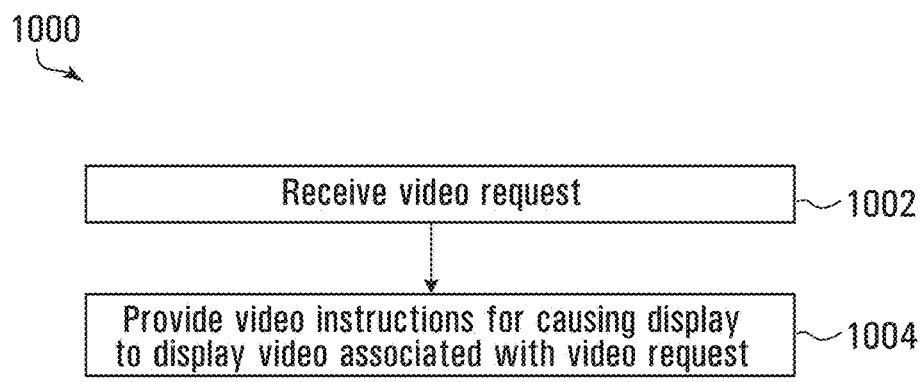
FIG. 23 is a flowchart depicting blocks of code for directing the location monitoring server of the system of FIG. 1 to perform location monitoring functions in accordance with various embodiments of the invention.

Referring to FIG. 23, the flowchart 1000 begins with block 1002 which directs the location monitoring processor 160 shown in FIG. 5 to receive a video request. For example, block 1002 may direct the location monitoring processor 160 to receive a message via the interface 170 and the network 20 from the monitoring station 14 shown in FIG. 4, the message representing a monitoring user's selection of the video request icon 780. Since the video request icon 780 is associated with the window 750 which is associated with the location identification record 650 and the requested user information record 700, a video request received based on selection of the video request icon 780 may be considered to include information included in the location identification record 650 and the requested user information record 700.

Figure 24:
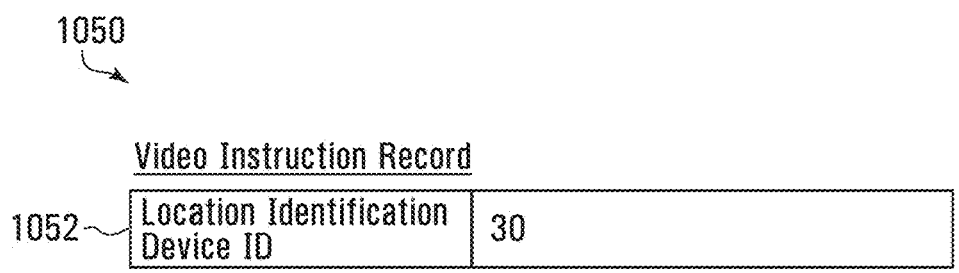
FIG. 24 is a representation of an exemplary video instruction record that may be used in the system shown in FIG. 1.

Block 1004 directs the location monitoring processor 160 to provide video instructions for causing the display 108 of the monitoring station 14 shown in FIG. 4 to display a video associated with the video request. Block 1004 may direct the location monitoring application to send a video instruction record to the video management server 19 shown in FIG. 7 to trigger the video management processor 190 executing the flowchart 1100 shown in FIG. 25. In some embodiments, block 1004 may direct the location monitoring processor to store the video instruction record in the location 179 of the storage memory 164. An exemplary video instruction record in accordance with one embodiment is shown at 1050 in FIG. 24.

The video instruction record 1050 includes a location identification device identifier field 1052 for storing a location identification device identifier which identifies a location identification device associated with the video request. Referring to FIG. 23, block 1004 may direct the location monitoring processor 160 shown in FIG. 5 to set the location identification device identifier field 1052 to identify the most recent known location of the device associated with the video request. Accordingly, block 1004 may direct the location monitoring processor 160 to set the location identification device identifier field 1052 to a location identification device identifier included in a location identification record that includes a most recent timestamp and has an EPC associated with the video request. For example, block 1004 may direct the location monitoring processor 160 to set the location identification device identifier field 1052 to the location identification device identifier from the location identification record 650.

Figure 25:
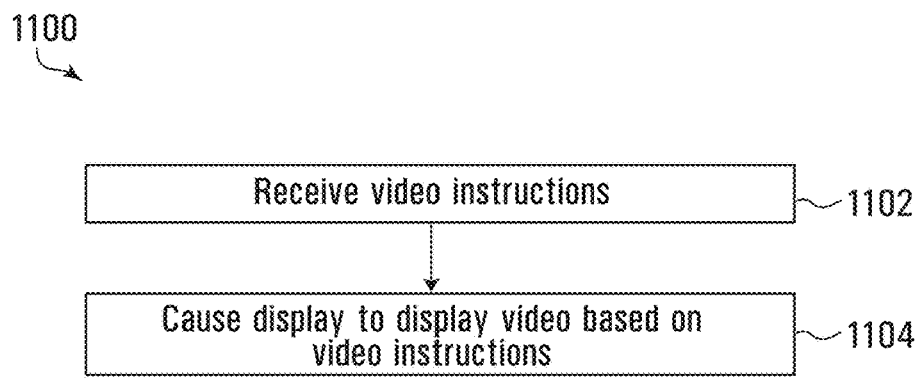
FIG. 25 is a flowchart depicting blocks of code for directing the video management server of the system of FIG. 1 to perform video management functions in accordance with various embodiments of the invention.

Block 1004 may direct the location monitoring processor 160 to send a message including the video instruction record 1050 to the video management server 19 via the interface 170 and the network 20, which may invoke flowchart 1100 as shown in FIG. 25 being executed by the video management processor 190.

Referring to FIG. 25, the flowchart 1100 depicts blocks of code for directing the video management processor 190 shown in FIG. 7 to perform video management functions in accordance with one embodiment. The flowchart 1100 may be encoded in the block of codes 198 shown in FIG. 7 for example. Accordingly, the flowchart 1100 may be considered to be executed by the video management application defined by the block of codes 198.

The flowchart 1100 begins with block 1102 which directs the video management processor 190 to receive video instructions. For example, block 1102 may direct the video management processor 190 to receive the video instruction record 1050 via the interface 193 and the network 20 from the location monitoring server 15. Block 1102 may direct the video management processor 190 to store the video instruction record 1050 in the location 195 of the storage memory 194 shown in FIG. 7.

Referring to FIG. 25, block 1104 then directs the video management processor 190 shown in FIG. 7 to cause the display 108 of the monitoring station 14 shown in FIG. 4 to display video based on the video instructions. For example, respective areas around each of the location identification devices may be known to be shown by one or more cameras or video feeds available to the video management server and so the video management server 19 may have previously stored an association between one or more video feeds or cameras and each of the location identification devices. Block 1104 may direct the video management processor 190 to send a video stream to the monitoring station 14 to cause the display 108 to display video from the one or more feeds associated with the location identification device identified by the identifier in the location identification device identifier field 1052 of the video instruction record 1050. This may provide a monitoring user with a video feed that shows the user at the location where they were last detected.

Referring now to FIG. 22, in some embodiments a similar process to that described and shown having regard to the flowchart 1000 shown in FIG. 19 may be executed by the person of interest processor 180 shown in FIG. 6, to trigger execution of the flowchart 1100 shown in FIG. 25 by the video management processor 190. For example, in some embodiments, a monitoring user may interact with the window 950 shown in FIG. 22 to request a video. In such embodiments, the monitoring station 14 may send a video request to the person of interest server 17 and a flowchart generally similar to the flowchart 1000 may be executed by the person of interest processor 180. Execution of the flowchart generally similar to the flowchart 1000 may be initiated by a monitoring user selecting a video request icon 960 as shown in FIG. 22, for example. A video instruction record may be generated and sent to the video management server 19 by the person of interest processor 180 including a camera identifier and the video management server 19 may have previously associated one or more video feeds or cameras with the camera identifier. Accordingly, selection of the video request icon 960 may result in the display 108 displaying video expected to be associated with the user shown in the window 950.

Various Embodiments

In some embodiments, separation of the functionality of the system 10 into different servers may facilitate control of and access to information within the system. This may be particularly desirable in the system 10 where personal and/or confidential information is managed. For example, keeping the servers separate may facilitate the servers being able to carry out different tasks otherwise prevented by security. For example, the location monitoring server 15 may not have access to certain user information and/or person of interest databases or watchlists, whereas in some embodiments the user monitoring server 13 and/or the person of interest server 17 may have such access or be able to provide such access. Further, the separation and modularity of the location monitoring server 15, the user monitoring server 13, and the person of interest server 17 may keep large positional or location data from being dumped into the watchlist or person of interest image database which may be configured to run on faster SSD drives designed for high numbers of queries.

Figure 26:
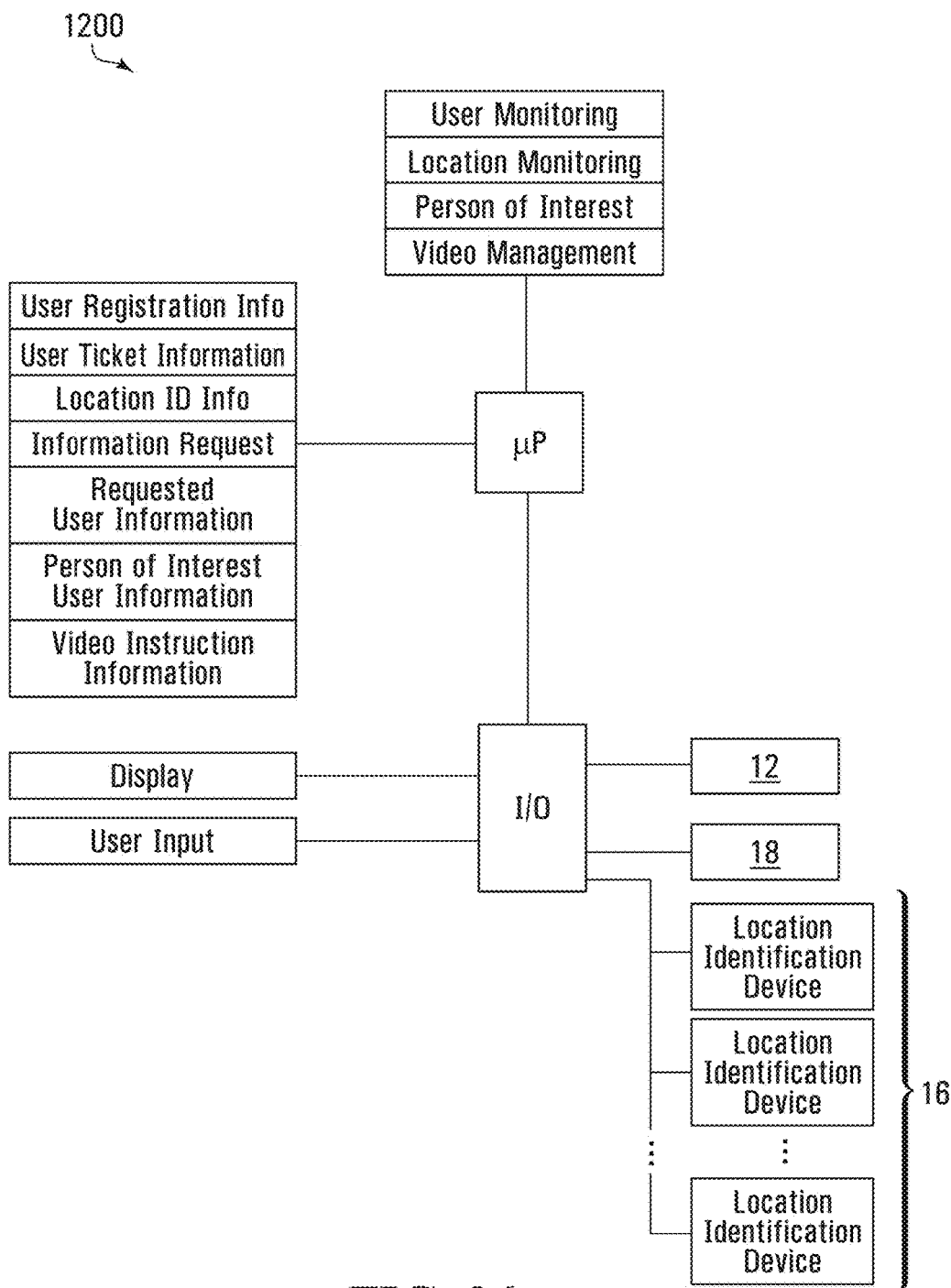
FIG. 26 is a schematic view of a system for facilitating monitoring of at least one of a plurality of users in accordance with various embodiments of the invention.

In some embodiments, the functionality of some or all of the applications herein may be provided by an integrated system having a single processor, such as system 1200 shown in FIG. 26, for example, which may be configured to implement the functionality of the monitoring station 14, the user monitoring server 13, the location monitoring server 15, the person of interest server 17, and the video management server 19. In some embodiments any or all of the blocks of codes 60, 120, 158, 168, 188, and 198 may be combined into a single application running on a single server. For example, in some embodiments one application may generally perform the functionality provided by the blocks in flowcharts 300 and 500, in some embodiments, one application may generally perform the functionality provided by the blocks in flowcharts 800 and 900, and in some embodiments, one application may generally perform the functionality provided by the blocks in flowcharts 1000 and 1100. In such embodiments, some of the blocks of code may be altered and/or omitted to facilitate the execution of the flowcharts by a single application.

While specific embodiments of the invention have been described and illustrated, such embodiments should be considered illustrative of the invention only and not as limiting the invention as construed in accordance with the accompanying claims.

The embodiments of the invention in which an exclusive property or privilege is claimed are defined as follow:

1. A computer-implemented method for facilitating monitoring of a first user of a plurality of users, the method comprising:
   causing at least one processor to receive a first user device identifier for identifying a first user device associated with the first user and first user registration information associated with the first user, the first user registration information including user identification information and a facial image of the first user;
   causing the at least one processor to store in memory the first user device identifier and first user information including the first user registration information;
   causing the at least one processor to receive a first information request including the first user device identifier;
   causing the at least one processor, upon receiving the first information request, to determine a last known location of the first user based on location identification information received from one or more location identification devices configured to detect locations of the first user device identifier;
   causing the at least one processor to produce signals representing the first user information for causing a display to display at least the first user registration information in association with a map representation including the last known location of the first user;
   causing the at least one processor to produce signals for providing the first user device identifier and the first user registration information for analysis to determine whether the first user registration information meets a person of interest criterion by comparing the facial image of the first user with a set of facial images of persons of interest and using biometrics to determine a match based on a threshold level of certainty; and causing the at least one processor to produce signals for causing the display to display a video feed associated with the last known location of the first user.

2. The method of claim 1 wherein the first user registration information includes identification document information.

3. The method of claim 1 further comprising causing the at least one processor to produce signals for:
   requesting additional information associated with the first user device identifier and causing the at least one processor to receive the additional information and to include the additional information in the first user information; and
   causing the display to display the additional information in association with the map representation.

4. The method of claim 1 wherein:
   the location identification information includes the first user device identifier and a location identifier identifying a location associated with the one or more location identification devices; and
   the method further comprises causing the one or more location identification devices to receive radio frequency signals representing the first user device identifier,
   such that reception of the radio frequency signals is indicative that the first user device is proximate to the one or more location identification devices.

5. The method of claim 1 further comprising causing the at least one processor to receive a video request and, in response to receiving the video request, produce the signals for causing the display to display the video feed.

6. The method of claim 1 further comprising causing the at least one processor to produce signals for causing the display to display an alert based on the match.

7. The method of claim 1 wherein the first user device identifier is a new user device identifier, the method further comprising:
   causing the at least one processor to receive an initial user device identifier; and
   causing the at least one processor to produce signals for causing the new user device identifier to be stored by the first user device.

8. A computer-implemented method for facilitating monitoring of a first user of a plurality of users, the method comprising:
   causing at least one processor to receive a first user device identifier for identifying a device associated with a first user and first user registration information associated with the first user, the first user registration information including user identification information and a facial image of the first user;
   causing the at least one processor to store in memory the first user device identifier and first user information including the first user registration information;
   causing the at least one processor to produce signals representing the first user device identifier and the first user information for causing the first user registration information to be analyzed to determine whether the first user registration information meets a person of interest criterion by comparing the facial image of the first user with a set of facial images of persons of interest and using biometrics to determine a match based on a threshold level of certainty;
   causing the at least one processor, upon receiving a first information request, to determine a last known location of the first user based on location identification information received from one or more location identification devices configured to detect locations of the first user device identifier;
   causing the at least one processor to produce signals representing the first user information for causing a display to display at least the first user registration information in association with a map representation including the last known location of the first user; and
   causing the at least one processor to produce signals for causing the display to display a video feed associated with the last known location of the first user.

9. The method of claim 8 further comprising causing the at least one processor to produce signals for causing the display to display an alert based on the match.

10. A system for facilitating monitoring of a first user of a plurality of users, the system comprising at least one processor configured to:
    receive a first user device identifier for identifying a first user device associated with the first user and first user registration information associated with the first user, the first user registration information including user identification information and a facial image of the first user;
    store in memory the first user device identifier and first user information including the first user registration information;
    receive a first information request including the first user device identifier;
    determine, upon receiving the first information request, a last known location of the first user based on location identification information received from one or more location identification devices configured to detect locations of the first user device identifier;
    produce signals representing the first user information for causing a display to display at least the first user registration information in association with a map representation including the last known location of the first user;
    produce signals representing the first user device identifier and the first user information for causing the first user registration information to be analyzed to determine whether the first user registration information meets a person of interest criterion by comparing the facial image of the first user with a set of facial images of persons of interest and using biometrics to determine a match based on a threshold level of certainty; and
    produce signals for causing the display to display a video feed associated with the last known location of the first user.

11. A system for facilitating monitoring of a first user of a plurality of users, the system comprising at least one processor configured to:
    receive a first user device identifier for identifying a device associated with the first user and first user registration information associated with the first user, the first user registration information including user identification information and a facial image of the first user;
    store in memory the first user device identifier and first user information including the first user registration information;
    produce signals representing the first user device identifier and the first user information for causing the first user registration information to be analyzed to determine whether the first user registration information meets a person of interest criterion by comparing the facial image of the first user with a set of facial images of persons of interest and using biometrics to determine a match based on a threshold level of certainty;

determine, upon receiving a first information request, a last known location of the first user based on location identification information received from one or more location identification devices configured to detect locations of the first user device identifier;

produce signals representing the first user information for causing a display to display at least the first user registration information in association with a map representation including the last known location of the first user; and produce, upon receiving a video request, signals for causing the display to display a video feed associated with the last known location of the first user.

12. A non-transitory computer readable medium having stored thereon codes which when executed by at least one processor cause the at least one processor to:

receive a first user device identifier for identifying a first user device associated with the first user and first user registration information associated with the first user, the first user registration information including user identification information and a facial image of the first user;

store in memory the first user device identifier and first user information including the first user registration information;

receive a first information request including the first user device identifier;

determine, upon receiving the first information request, a last known location of the first user based on location identification information received from one or more location identification devices configured to detect locations of the first user device identifier;

produce signals representing the first user information for causing a display to display at least the first user registration information in association with a man representation including the last known location of the first user;

produce signals representing the first user device identifier and the first user information for causing the first user registration information to be analyzed to determine whether the first user registration information meets a person of interest criterion by comparing the facial image of the first user with a set of facial images of persons of interest and using biometrics to determine a match based on a threshold level of certainty; and produce signals for causing the display to display a video feed associated with the last known location of the first user.

13. A non-transitory computer readable medium having stored thereon codes which when executed by at least one processor cause the at least one processor to:

receive a first user device identifier for identifying a device associated with a first user and first user registration information associated with the first user, the first user registration information including user identification information and a facial image of the first user;

store in memory the first user device identifier and first user information including the first user registration information;

determine, upon receiving a first information request, a last known location of the first user based on location identification information received from one or more location identification devices configured to detect locations of the first user device identifier;

produce signals representing the first user device identifier and the first user information for causing the first user registration information to be analyzed to determine whether the first user registration information meets a person of interest criterion by comparing the facial image of the first user with a set of facial images of persons of interest and using biometrics to determine a match based on a threshold level of certainty;

produce signals representing the first user information for causing a display to display at least the first user registration information in association with a map representation including the last known location of the first user; and produce signals for causing the display to display a video feed associated with the last known location of the first user.

14. The method of claim 8 wherein:

the location identification information includes the first user device identifier and a location identifier identifying a location associated with the one or more location identification devices; and the method further comprises causing the one or more location identification devices to receive radio frequency signals representing the first user device identifier, such that reception of the radio frequency signals is indicative that the first user device is proximate the one or more location identification devices.

15. The system of claim 10 wherein the at least one processor is configured to produce signals for causing the display to display an alert based on the match.

16. The system of claim 10 wherein:

the location identification information includes the first user device identifier and a location identifier identifying a location associated with the one or more location identification devices;

the one or more location identification devices are configured to receive radio frequency signals representing the first user device identifier; and reception of the radio frequency signals is indicative that the first user device is proximate to the one or more location identification devices.

17. The system of claim 11 wherein the at least one processor is configured to produce signals for causing the display to display an alert based on the match.

18. The system of claim 11 wherein:

the location identification information includes the first user device identifier and a location identifier identifying a location associated with the one or more location identification devices;

the one or more location identification devices are configured to receive radio frequency signals representing the first user device identifier; and reception of the radio frequency signals is indicative that the first user device is proximate to the one or more location identification devices.

19. The non-transitory computer readable medium of claim 12 wherein the codes cause the at least one processor to produce signals for causing the display to display an alert based on the match.

20. The non-transitory computer readable medium of claim 12, wherein:

the location identification information includes the first user device identifier and a location identifier identifying a location associated with the one or more location identification devices;

the one or more location identification devices are configured to receive radio frequency signals representing the first user device identifier; and reception of the radio frequency signals is indicative that the first user device is proximate to the one or more location identification devices.

21. The non-transitory computer readable medium of claim 13 wherein the codes cause the at least one processor to produce signals for causing the display to display an alert based on the match.

22. The non-transitory computer readable medium of claim 13, wherein:

the location identification information includes the first user device identifier and a location identifier identifying a location associated with the one or more location identification devices;

the one or more location identification devices are configured to receive radio frequency signals representing the first user device identifier; and reception of the radio frequency signals is indicative that the first user device is proximate to the one or more location identification devices.

* * * * *

UNITED STATES PATENT AND TRADEMARK OFFICE
CERTIFICATE OF CORRECTION

PATENT NO. : 10,121,058 B2  
APPLICATION NO. : 15/169491  
DATED : November 6, 2018  
INVENTOR(S) : Peyman Askari et al.

Page 1 of 1

It is certified that error appears in the above-identified patent and that said Letters Patent is hereby corrected as shown below:

In Claim 12, Column 27, Line 39, the word "man" should be changed to --map--

Signed and Sealed this  
Seventh Day of May, 2019

Andrei Iancu  
*Director of the United States Patent and Trademark Office*